United States Patent
Janzig et al.

(10) Patent No.: US 7,139,768 B1
(45) Date of Patent: Nov. 21, 2006

(54) OLE DB DATA ACCESS SYSTEM WITH SCHEMA MODIFICATION FEATURES

(75) Inventors: Richard Charles Janzig, Mision Viejo, CA (US); David Michael Dahm, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/564,248

(22) Filed: May 4, 2000

(51) Int. Cl.
*G06F 17/30* (2006.01)

(52) U.S. Cl. ............... 707/102; 707/100; 707/101; 707/103 R; 715/853; 715/854

(58) Field of Classification Search ........... 707/100, 707/101, 102, 103 R, 103 X; 345/853, 854
See application file for complete search history.

(56) References Cited

U.S. PATENT DOCUMENTS

| | | | |
|---|---|---|---|
| 5,495,567 A * | 2/1996 | Iizawa et al. | 345/762 |
| 5,627,979 A * | 5/1997 | Chang et al. | 345/763 |
| 5,911,142 A * | 6/1999 | Smith et al. | 707/101 |
| 6,014,138 A * | 1/2000 | Cain et al. | 345/826 |
| 6,119,122 A * | 9/2000 | Bunnell | 707/102 |
| 6,175,837 B1 * | 1/2001 | Sharma et al. | 707/103 Y |
| 6,263,339 B1 * | 7/2001 | Hirsch | 707/102 |
| 6,282,547 B1 * | 8/2001 | Hirsch | 707/102 |
| 2001/0034733 A1 * | 10/2001 | Prompt et al. | 707/102 |

OTHER PUBLICATIONS

U.S. Appl. No. 60/186,814, filed Mar. 2000, Prompt et al.*

* cited by examiner

*Primary Examiner*—Khanh B. Pham
(74) *Attorney, Agent, or Firm*—Nathan Cass; Mark T. Starr; Lise A. Rode

(57) ABSTRACT

Mapping of data source schema data types relating a server side database description into a set of OLE DB data types is rendered subject to user modification by provision of a dual Schema File at a client side terminal which contains an original copy and a modifiable copy of the data source schema. Selected contents of the modifiable Schema File are then displayed in a split window format, including one window which provides a tree view of the schema structure and an adjacent window which displays a set of values related to a selected element of the tree view. Selected values are then subject to modification via user point and click and data entry operations.

62 Claims, 24 Drawing Sheets

*FIG. 14*

OLE DB DATA ACCESS SYSTEM WITH SCHEMA MODIFICATION FEATURES

BACKGROUND OF THE INVENTION

1. Field of the Invention

The subject invention relates generally to data processing systems and more particularly to a schema utility for modifying schema presented to a user on a client side of a system employing OLE DB data providers.

2. Description of Related Art

In the present state of the art, data is located everywhere: on mainframe servers, on PC desktops, on the web. Data resides in these environments in many different formats: relational and non-relational database management systems, ISAM files, e-mail, spreadsheets, audio, video, real time data feeds for news and stock, CAD/CAM systems, and so on.

With today's tools and software technology, there is increasing pressure to provide access to this diverse data from multiple clients using standard interfaces, without moving the data from its origin. Businesses need to build solutions that span desktops, servers, and the Internet. In addition, the end user wants to access this data in the same way, regardless of the language used.

In order to facilitate access to structured and unstructured data in such diverse locations, Microsoft Corporation has developed a software interface specification known as OLE DB. OLE DB particularly provides a set of Component Object Model (COM) interfaces. According to OLE DB, data "Providers" are employed to expose data stored as OLE DB compliant data sources so as to allow access to them by OLE DB data "consumers".

In one environment where the preferred embodiment finds application, a Data Provider provides communication between OLE DB data consumers on Windows workstations or servers and prior art data sources consisting, for example, of a Unisys DMS II database. A Data Provider per se is a component in Microsoft's Universal Data Access model.

In such an environment, Client data is stored in PC format, which means that alpha data is encoded in ASCII characters and integers are stored with their bytes in reverse order (a characteristic of the Intel processors that are typically used on PC's). The format of data as stored in prior art data sources is typically quite different. For example, alpha data on the host data source may be encoded in EBCDIC and integers may be stored with their bytes in normal order. Such encoding and storage is employed for example in Clearpath and A-Series environments present on prior art computer systems manufactured by Unysis Corp., Blue Bell, Pa.

The Data Provider of the preferred embodiment defines a format (the common data source schema) for describing the structures and data items for all the supported data sources. Within the common data source schema, each of the prior art data sources has some unique data types. The OLE DB specification defines a set of data types. The mapping of prior art data source data types to the OLE DB data types is not always obvious or clear-cut. For example, the DMSII data source does not have a "date" data type, although dates are stored in DMSII databases. OLE DB does have a "date" data type. Moreover, the elements of the common data source schema may appear in formats which are not as recognizable or meaningful to the user as they might be.

SUMMARY OF THE INVENTION

According to the invention, a method and apparatus are provided whereby the mapping between data types may be reassigned and structure and date item names and other parameters altered, for example, by a user or a database administrator. According to one aspect of the invention, a dual Schema File is maintained at a client side terminal, the Schema File containing an original copy of the data source schema and a modifiable copy of the data source schema. The contents of the modifiable Schema File may then be displayed in a split window format including one window which provides a tree view of the schema structure and an adjacent window which displays a set of values related to the selected element of the tree view and one or more of the values may then be modified by executing a point and click operation on selected areas in the second window. As used herein, "point and click" encompasses equivalent screen selection operations, such as for example, point and touch operations using a stylus, as presently implemented on various palm-held devices.

Various objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

The embodiment of the just summarized invention will now be described in detail in conjunction with the drawings of which:

FIG. 14 illustrates the nature of a thirteenth display screen provided according to the preferred embodiment;

DETAILED DESCRIPTION OF AN EMBODIMENT

Figure 1:
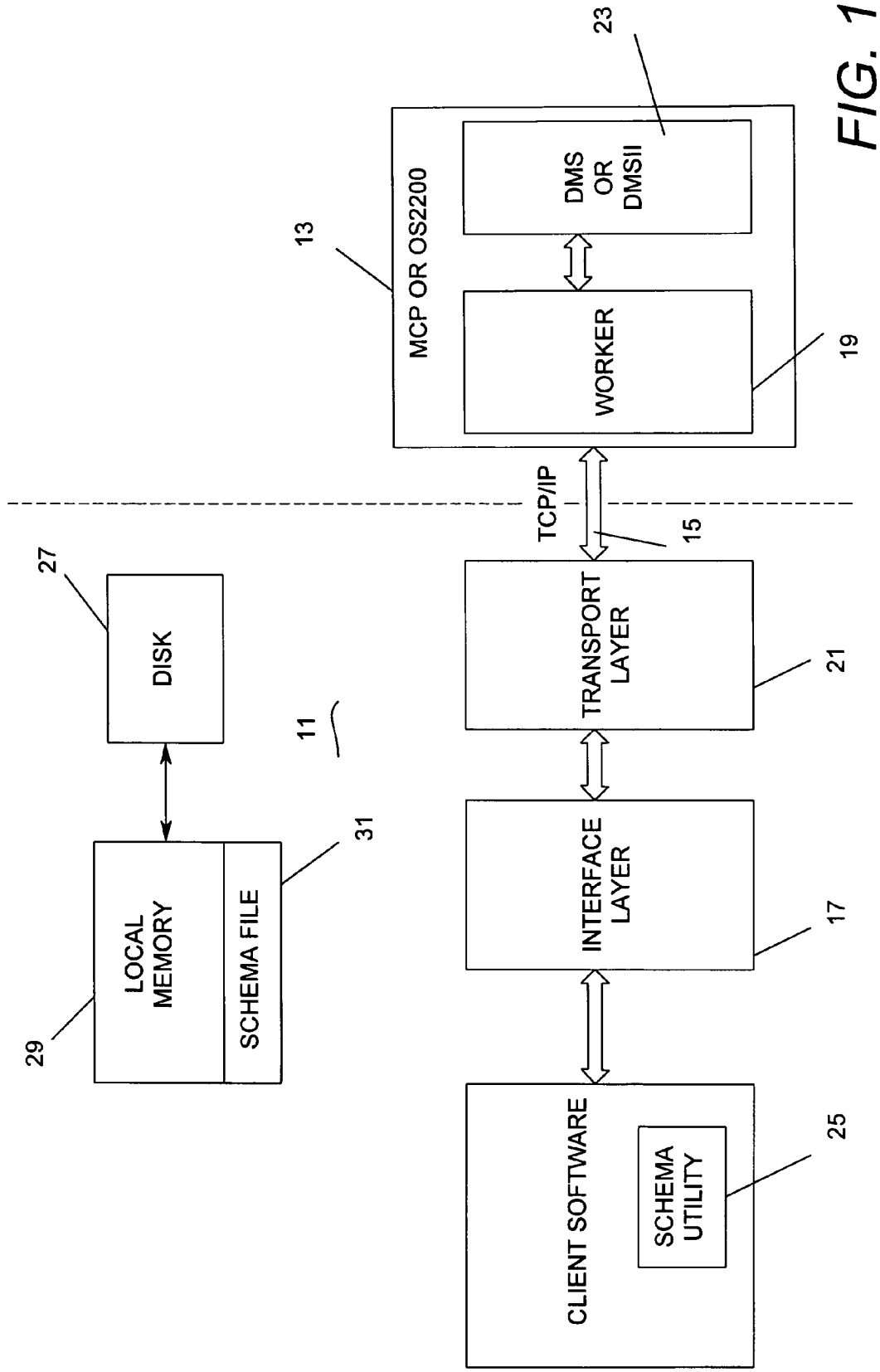
FIG. 1 is a system block diagram illustrating a system wherein the preferred embodiment of the invention finds application.

FIG. 1 illustrates an environment where a preferred embodiment of the invention finds application. This environment includes a client 11 and a server 13, which communicate with one another across a TCP/IP connection 15. The client 11 and server 13 each comprise computer controlled apparatus, as known in the art.

In operation, the client 11 sends messages called "requests" across the connection 15 to the server 13, and the server 13 returns messages called "results" across the connection 15 to the client 11. Requests and results consist of strings of bytes. A request might, for example, ask for return of all data having a certain characteristic and stored on a database forming part of the server 13.

On the client 11, data is stored in PC format, which, as noted above, means that alpha data is encoded in ASCII characters and integers are stored with their bytes in reverse order. The format of data on the host (server) 13 is typically quite different. For example, alpha data on the host 13 may be encoded in EBCDIC with integers stored with their bytes in normal order.

In one environment where the preferred embodiment finds application, a "Data Provider" provides communication between OLE DB data consumers on Windows workstations (e.g., "client" 11) and prior art data sources consisting, for example, of a Unisys DMS II (or DMS) database 23, either one of which is associated with a main frame computer.

A particular Data Provider design created by Unisys includes three major components, which are illustrated in FIG. 1. The major components include a front end called the OLE DB Interface Layer 17 (or simply Interface Layer). The Data Provider further includes a back end called the Worker 19 that accesses the database management system (e.g., DMS II 23), as well as an intermediate component called the Transport Layer 21 that provides connectivity between the Interface Layer 17 and the Worker 13. The Interface Layer 17 and the Transport Layer 21 are implemented as component object model (COM) components.

The function of the Transport Layer 21 is to send and receive messages between the Interface Layer 17 and the Worker 19 and to provide the necessary marshalling and unmarshalling services. The Transport Layer 21 establishes and maintains connections with the host using TCP/IP as the connection protocol.

The Interface Layer exposes a Windows based COM API (application program interface), which comprises a subset of the standard OLE DB interfaces. This subset includes all of the mandatory OLE DB interfaces, as well as those optional OLE DB interfaces necessary to allow full exploitation of the capabilities of the data sources.

When the OLE DB Interface Layer 17 receives an open rowset command (basically a query) from the data consumer, it passes the query to the Transport Layer 21. The Transport Layer 21 builds a tree structured collection of nodes called a "plan" to represent the query and saves it until the first call for access to the rowset is received. When the first rowset access command is received, a query using the saved plan is formulated and encoded (marshalled) for delivery to the Worker 19.

The Worker 19 interprets the plan and generates the appropriate DMSII calls to execute the query. The data that is returned by the DMSII 23 is then returned. The OLE DB Interface Layer 17 fetches the requested rows from the Transport Layer 21, converts each column in all of the rows to the format requested by the Consumer, and copies the data into the Consumer's memory space.

In the preferred embodiment, different designations of stored data exist at different points in the system. For purposes of the subject application, these designations are defined as follows:

Database description: a description of a prior art database such as a DMS or DMSII database 23, which resides on a mainframe. This description is the master definition of the database and is created on the mainframe by prior art database tools. The database description can change if the prior art database structure is modified or reorganized.

Schema: a description of a prior art database, which resides on a workstation 11. This description is derived from the database description and converted by the Interface Layer 17 to a form that is oriented to the use of OLE DB on the workstation.

Dual Schema File: a binary file, generated according to the preferred embodiment, which resides on a workstation and contains two copies of a schema—an unmodifiable original and a modifiable working copy. This file is created by the Interface Layer, but can be modified by a Schema Utility as hereafter described. The Schema Utility only modifies the working copy schema.

Within the common data source schema, each of the prior art data sources, e.g., DMS or DMS II, has some unique data types. OLE DB also defines a set of data types. The mapping of data source data types to the OLE DB data types is not always obvious or clear-cut. For example, the DMSII data source 23 does not have a "date" data type, although dates are stored in DMSII databases. OLE DB does have a "date" data type.

In the environment under discussion, prior art data source data types such as those employed DMSII are required to be described in OLE DB terms. Accordingly, a "default mapping" is employed which assigns a particular OLE DB type to describe a particular DMS II data types.

Type indicators are index values which designate or indicate a type. In the environment under discussion, there are two varieties of type indicators. The first variety is the set of Microsoft OLE DB defined type indicators, such as DBTYPE_STR, DBTYPE_I4, etc. This is defined as an enumeration, DBTYPEENUM. Microsoft has currently used some of the numbers between 0 and 140. All members of this set are spelled starting with DBTYPE.

The second variety of the type indicators is the set of Unisys defined type indicators. These indicators are used to designate types which can occur in DMS II data sets, as well as types which might occur in DMS databases and in schema rowsets. These indicators are defined as an enumeration, an_item_type. Most members of this set are spelled starting with item_. When the type indicator from the Unisys set indicates a type which is the same as an OLE DB type, the same number is used, although the name is different. For example, DBTYPE_UI2 and item_UI2 are the same number and indicate an unsigned 16 bit integer. The type indicators from the Unisys set which do not overlap the Microsoft set indicate types which are DMS II types. These numbers are all greater than 180. For example, item_real=190 and indicates a data item of type real in Unisys A Series 48 bit format.

The correspondence between the item type indicators and the DASDL construct is given by the following table:

| | |
|---|---|
| item_alpha | ALPHA |
| item_integer | REAL(Sp) |
| item_us_integer | REAL(p) |
| item_packed | NUMBER(S) |
| item_us_packed | NUMBER |
| item_fixed | REAL(Sp,s) |
| item_us_fixed | REAL(p,s) |
| item_real | REAL |
| item_boolean | BOOLEAN |
| item_field | FIELD |
| grouped_item | GROUP |
| item_db_alpha | ALPHA with Asian character set specified |
| item_alpha_date | ALPHA with date semantics given |
| item_packed_date | NUMBER(S) with date semantics given |
| item_us_packed_date | NUMBER with date semantics given |
| item_integer_date | REAL(n) with date semantics given |
| item_record_type | TYPE |
| item_population | POPULATION |

"DASDL" is the "Data and Structural Definition Language" which is used to define a DMSII database. According to the preferred embodiment, a Schema Utility 25 is provided, which allows the client to override the default mappings between DMSII data types and OLE DB data types on an item by item basis. The Schema Utility 25 also allows the client to change the names of structures and data items, from sometimes quite arbitrary names, to something meaningful to the client in the full character set of the workstation.

With respect to FIG. 1, the Schema Utility 25 reads a Schema File 31 created by the Interface Layer in disk storage 27. The Schema File 31 contains a description of the prior art data source (e.g., DMSII 23) in the format defined by the Data Provider. When the client is done making modifications to the Schema File 31 and requests that the changes be saved, the Schema Utility 25 updates the Schema File 31 on the workstation disk 27. The changes are then visible the next time the Data Provider connects to the data source 23. None of the changes affects the data in the data source 23. The modified Schema File 31 can be copied to other workstations to be used by other clients, if desired.

If a value of an item has been modified in the current or a previous session, the client can ask to have the modification undone, and it will be changed back to its original value. As will be illustrated below, this is done by selecting a column heading or a current value, selecting a restore button in an edit dialog box, and then selecting update.

The OLE DB Schema Utility 25 of the preferred embodiment is Windows-based. In particular, it is a Microsoft Foundation Class, Single Document Interface, Win32, Graphical User Interface, Visual C++ program. It uses a simplified Document-View architecture to present a data source schema in a split window graphical user interface format for updating by a client. The majority of the updating done by the client is by point and click, only the text for names and numbers for values need to be typed in.

Figure 2:
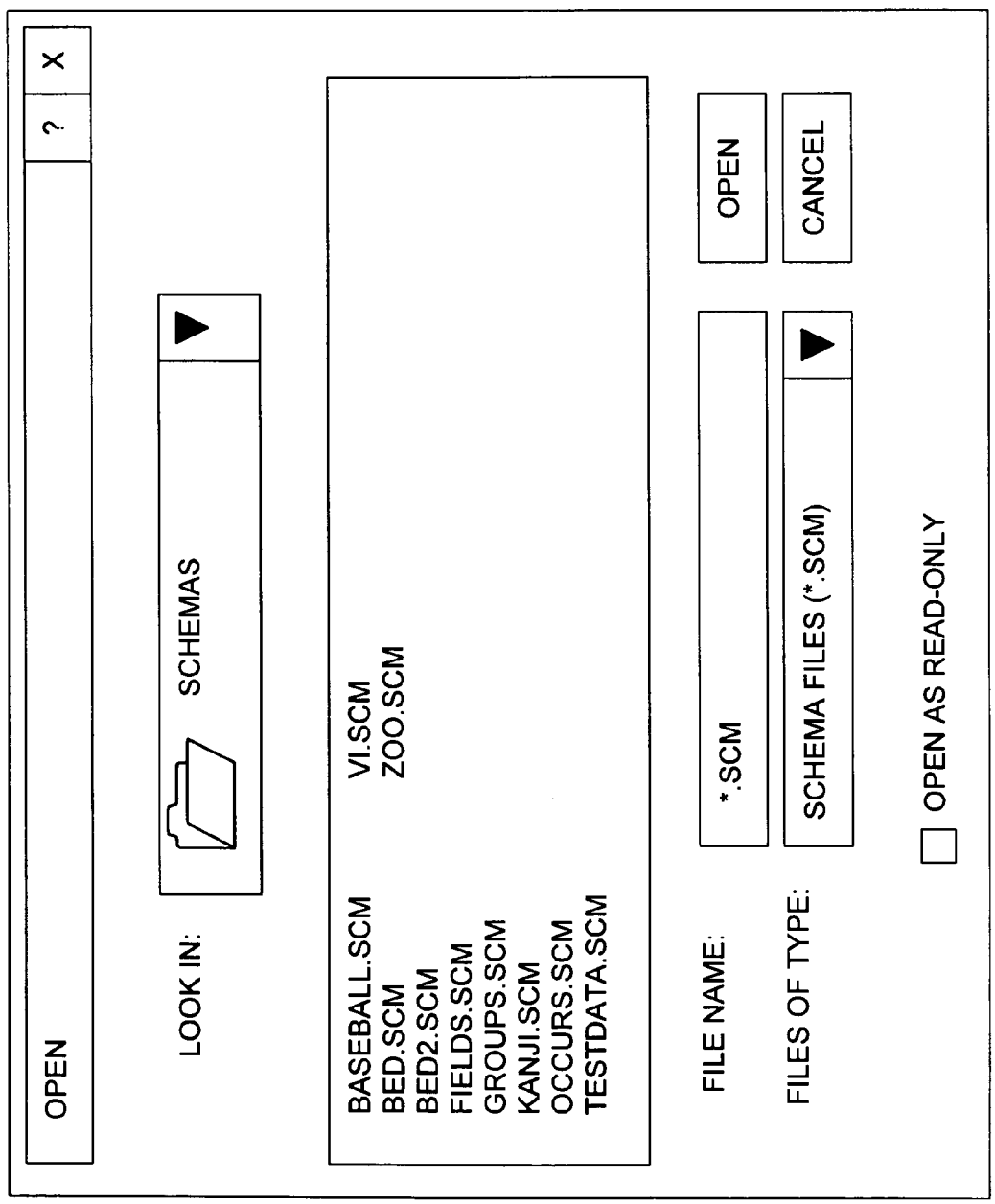
FIG. 2 illustrates the nature of a first display screen provided according to the preferred embodiment.

Referring now to FIG. 2, the Schema Utility 25 uses the Windows common file control to open and save Schema Files. The "open" command searches for files with a .scm extension. The Schema File 31 created by the Interface Layer contains two copies of the schema: the original, and a modifiable copy. The Schema File 31 is a binary file with the names written in wide characters. No changes are committed to the Schema File 31 until the client has selected a save option. Any change to an attribute of the schema can be undone, returning the changed attribute back to the value stored in the original copy of the schema.

Figure 3:
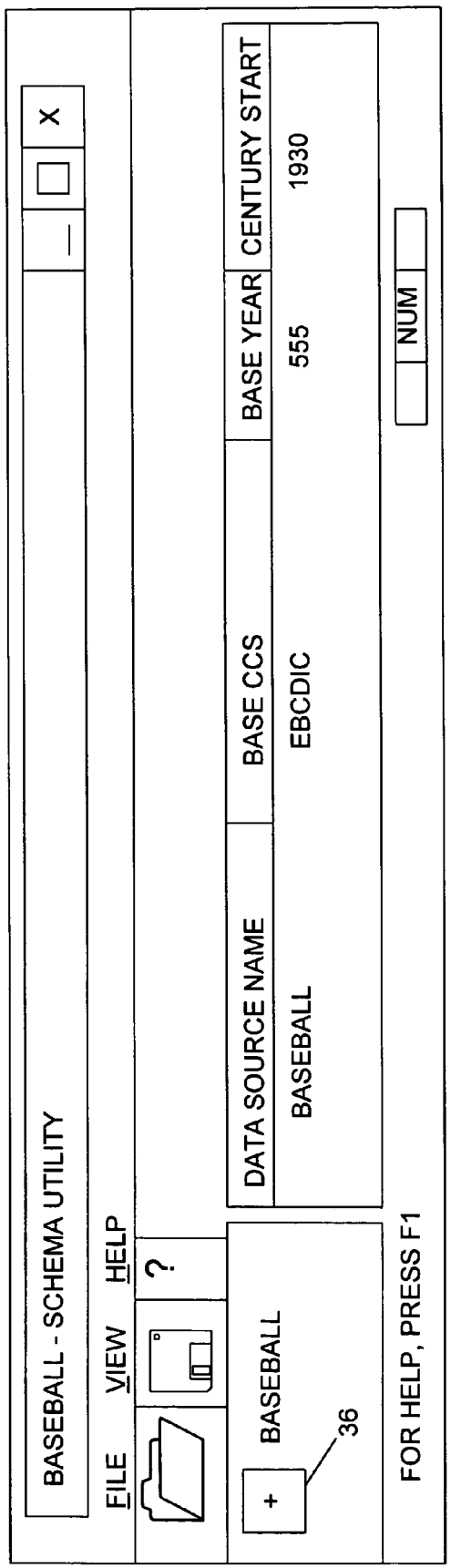
FIG. 3 illustrates the nature of a second display screen provided according to the preferred embodiment.
Figure 4:
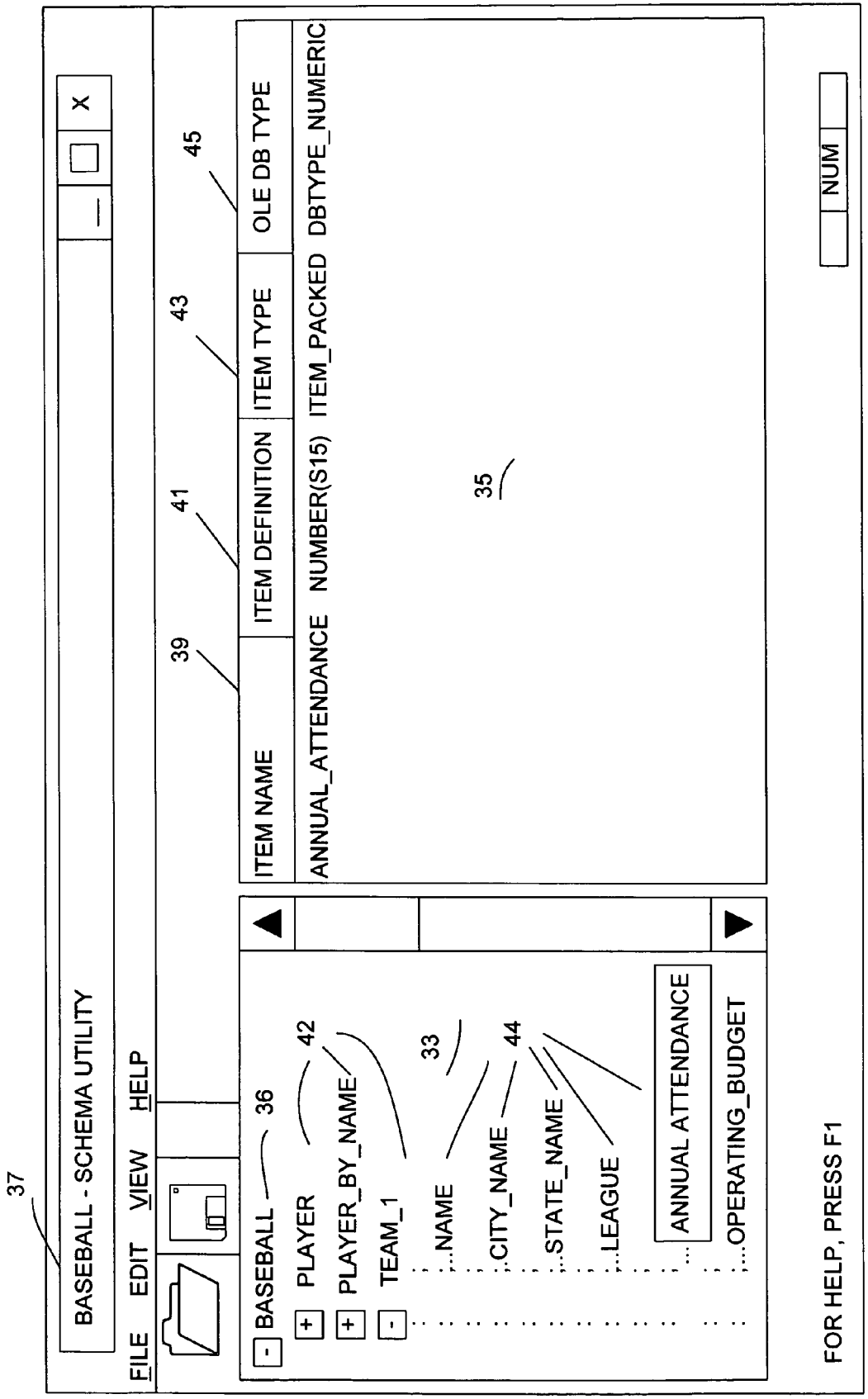
FIG. 4 illustrates the nature of a third display screen provided according to the preferred embodiment.

When the Schema File 31 is opened, a tree view 33 is created, but is shown unfolded, as illustrated in FIG. 3. The client can expand the tree view 33 by selecting the "plus" signs (+), e.g. 36, beside the different items. A result of such selection is shown in FIG. 4. The highest level in the tree, the root node, ("baseball" in FIG. 4) is the data source. The next level displays the data structures, e.g., 42, in sorted order. The third level and beyond display the data items, e.g., 44.

To see the details of an individual item, the client selects the name in the tree view 33, for example, "annual attendance" as shown in FIG. 4. The tree view 33 contains some visual clues about special types of items. Subordination indicates that the parent node has a defining or controlling relationship to the leaf nodes underneath. Other visual clues are used to indicate variable format data items and occurring data items. In particular, the data items in variable format records are indicated by their type number followed by a colon. Occurring data items are indicated by square brackets following their name. The number in the brackets is the number of times the data item can be repeated. Group data items are shown as subordinate to the group name. Field data items are also shown as subordinate to the field name.

As may be appreciated from FIGS. 2–4, the user interface has a look and feel similar to Windows Explorer. The main window is divided into two panels 33, 35. The left panel 33 contains the tree view control showing the schema. The root node 37 ("baseball"), visually the top item of the tree view, is the data source. The right panel 35 of the main window contains a list view control that gives the details of an item which has been highlighted in the left panel 33. The right panel 35 presents the details of the item in a column view display. The number of columns, e.g., 39, 41, 43, 45 of FIG. 4 and their titles change depending upon the highlighted item. The first column 39, however, always contains the item's name.

If a value of an item in the column view display is modifiable, selecting the column heading or the value causes a dialog box to pop up. Help text may be made available to describe the options presented by the dialog. In the present embodiment, the modifiable values of the data source schema are:

Base CCS (code character set)
Double-Byte CCS (if an item_db_alpha, USAGE IS KANJI, item exists)
Base Year
Century Start
Structure Name
Data Item Name
Data Item Type The Schema Utility 25 allows the client, via point and click, to modify the Item Type 43 whenever there is a possible alternate mapping of the item to an OLE DB Type. For example, the utility 25 enables converting an Item Type 43 of "item alpha" to "item_BYTES". The Utility 25 also allows the client to modify the Item Name 39. The nature of the left and right panel displays 33, 35 and various point and click operations are illustrated further in the following FIGS. 5–15.

Figure 5:
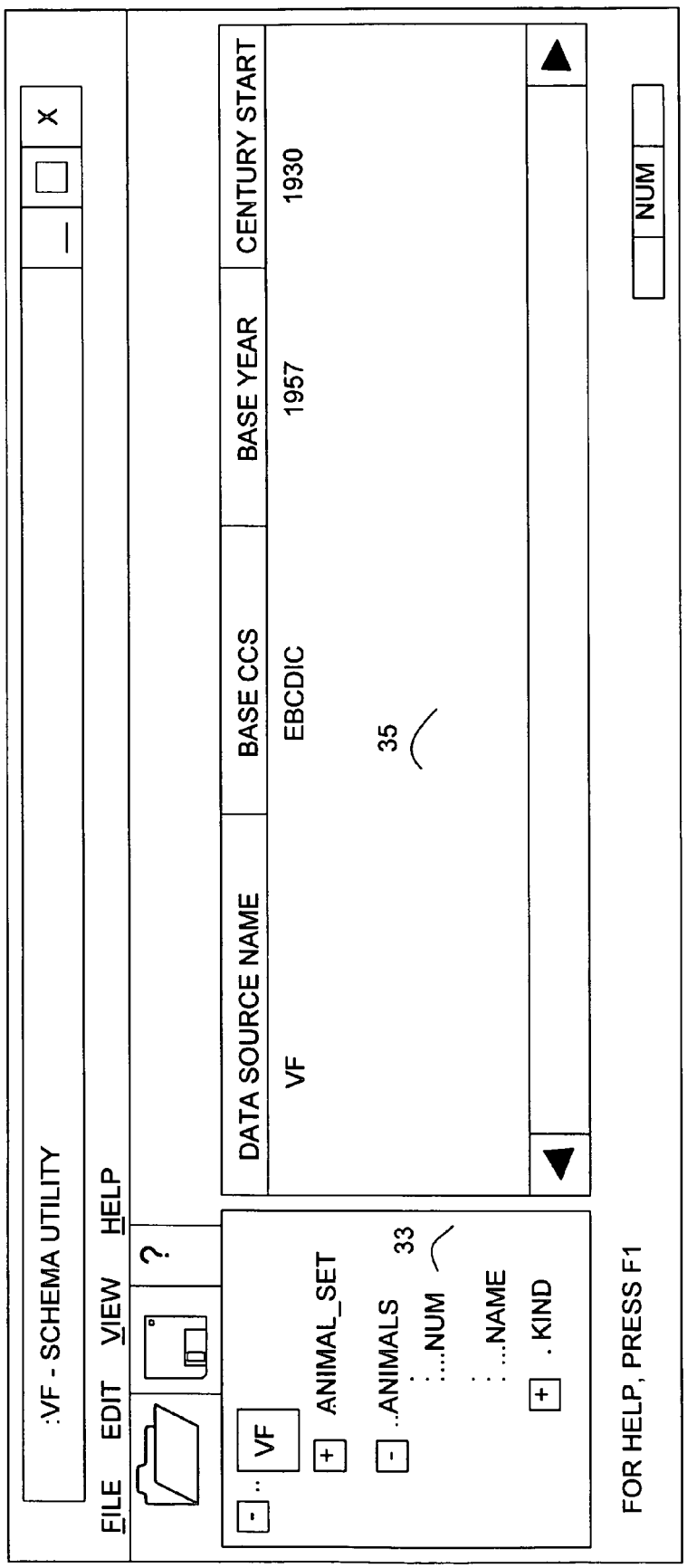
FIG. 5 illustrates the nature of a fourth display screen provided according to the preferred embodiment.

In the display of FIG. 5, the column view of the top level (the root node) of the data source contains the highlighted data source name ("vf"), the coded character set (CCS) of the alpha data items ("EBCDIC"), and the base year and the century start values ("1957", "1930") for date handling. If the data source has double-byte alpha data items, the double-byte coded character set value is also displayed.

Figure 6:
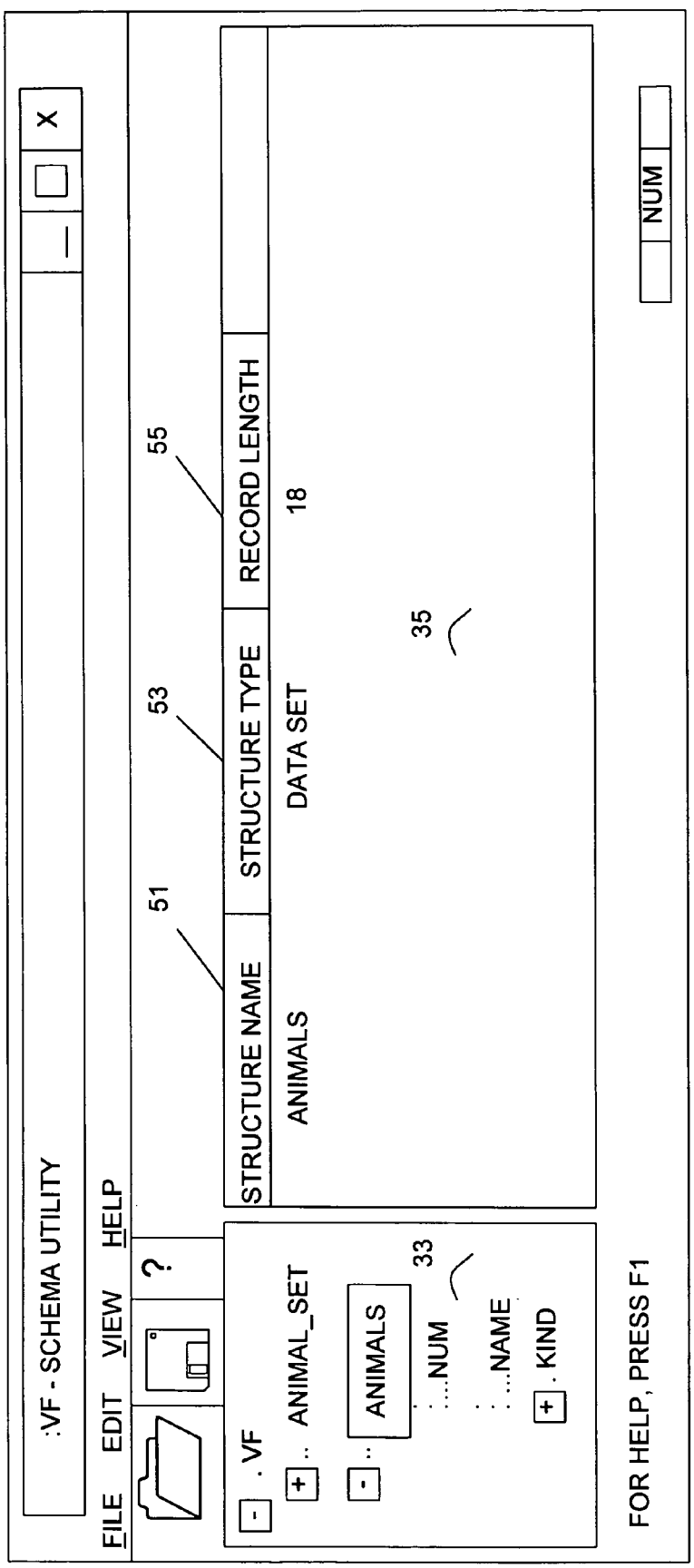
FIG. 6 illustrates the nature of a fifth display screen provided according to the preferred embodiment.

As shown in FIG. 6, highlighting the next level "animals" in the tree provides display of the structures defined for the "vf" data source. The column view displays the structure name (col. 51) and the structure type (col. 53). If the structure is a data set, then the column view also displays the length of the data structure (col. 55), as further illustrated in FIG. 6.

Figure 7:
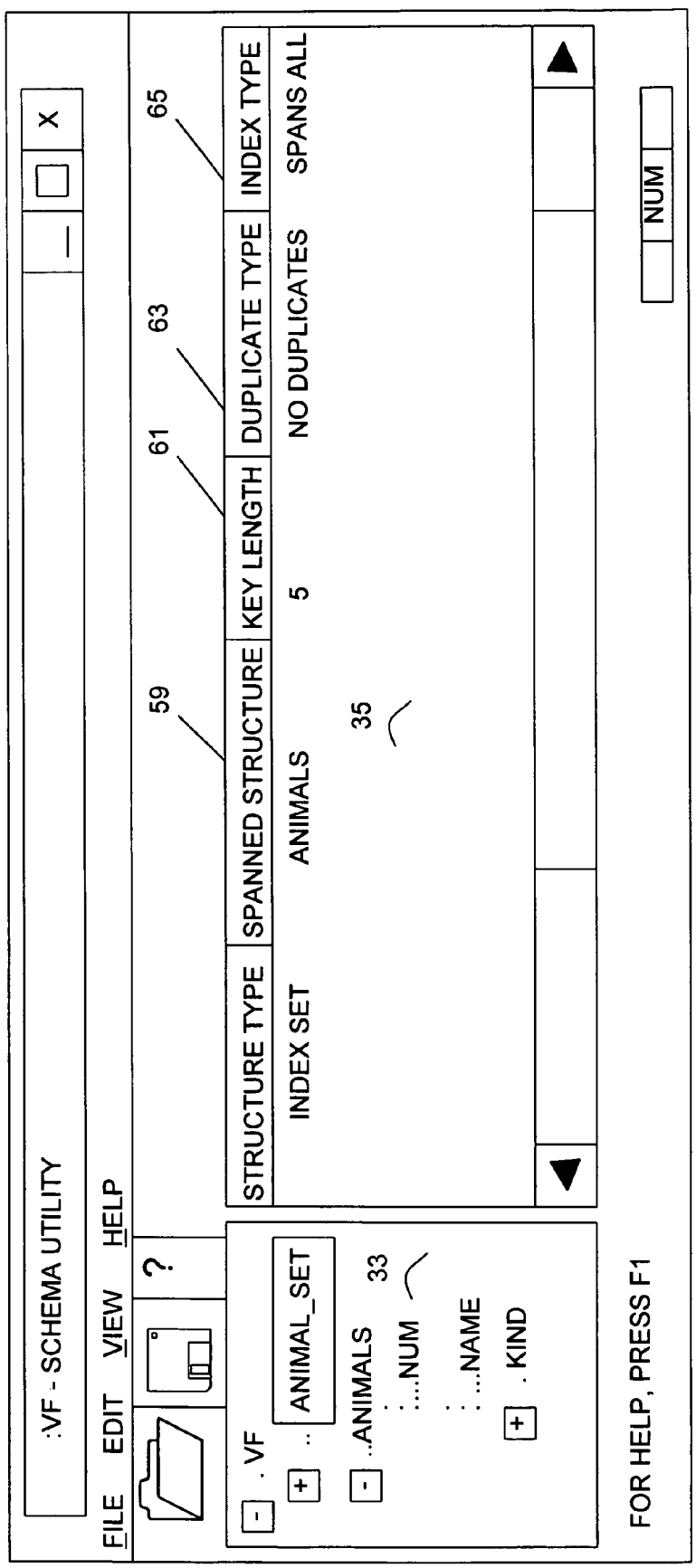
FIG. 7 illustrates the nature of a sixth display screen provided according to the preferred embodiment.

As shown in FIG. 7, if the structure is an index set, then the column view displays the name of the structure that the index set spans (col. 59), the length of the index key (col. 61), whether or not duplicates are allowed (col. 63), and the type of index (col. 65).

Figure 8:
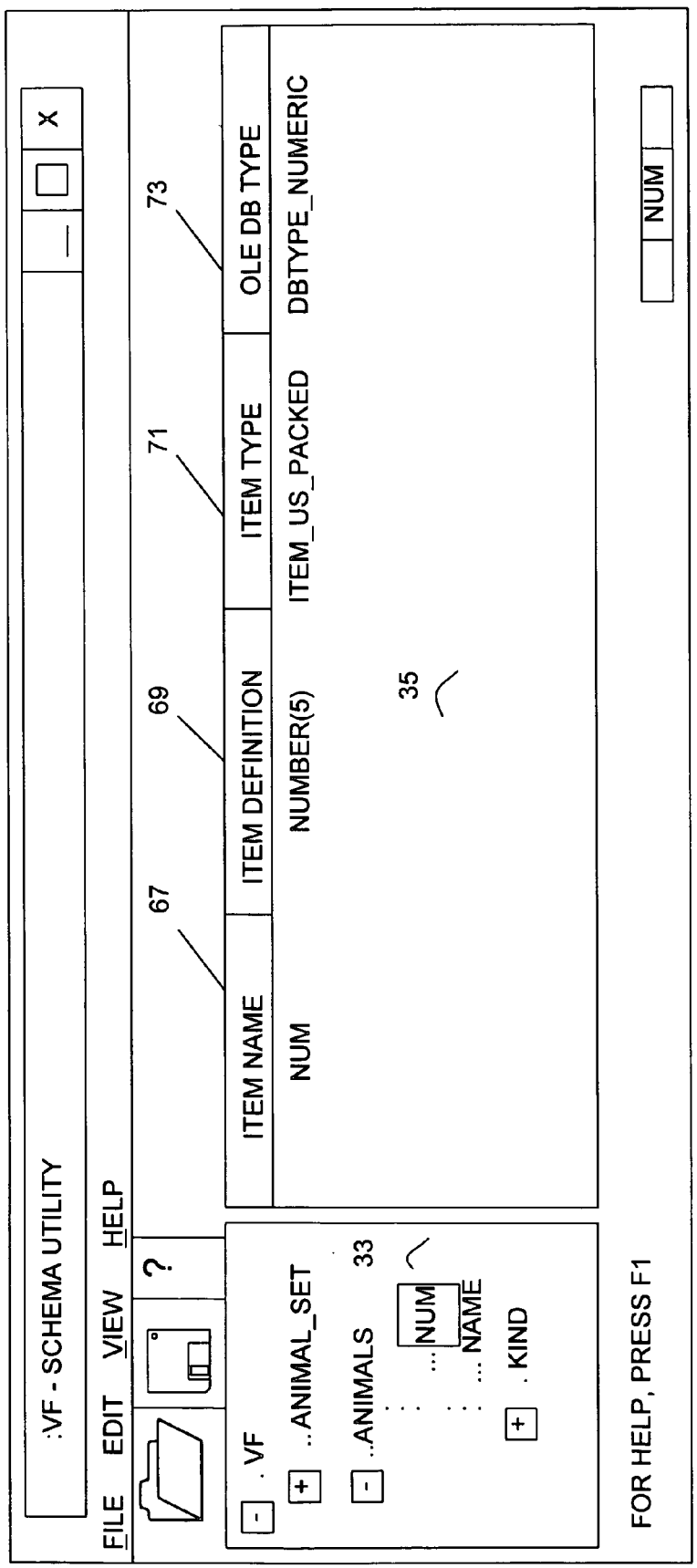
FIG. 8 illustrates the nature of a seventh display screen provided according to the preferred embodiment.

The next level in the tree, illustrated in FIG. 8, displays the data items within a structure. The column view displays the name of the highlighted data item (col. 67), the definition of the data item in a DASDL-like format (col. 69), the prior art data source (e.g., Clearpath, A Series, etc.) data type of the data item (col. 71), and the OLE DB data type (col. 73) that the data item will be mapped into by the Data Provider.

Figure 9:
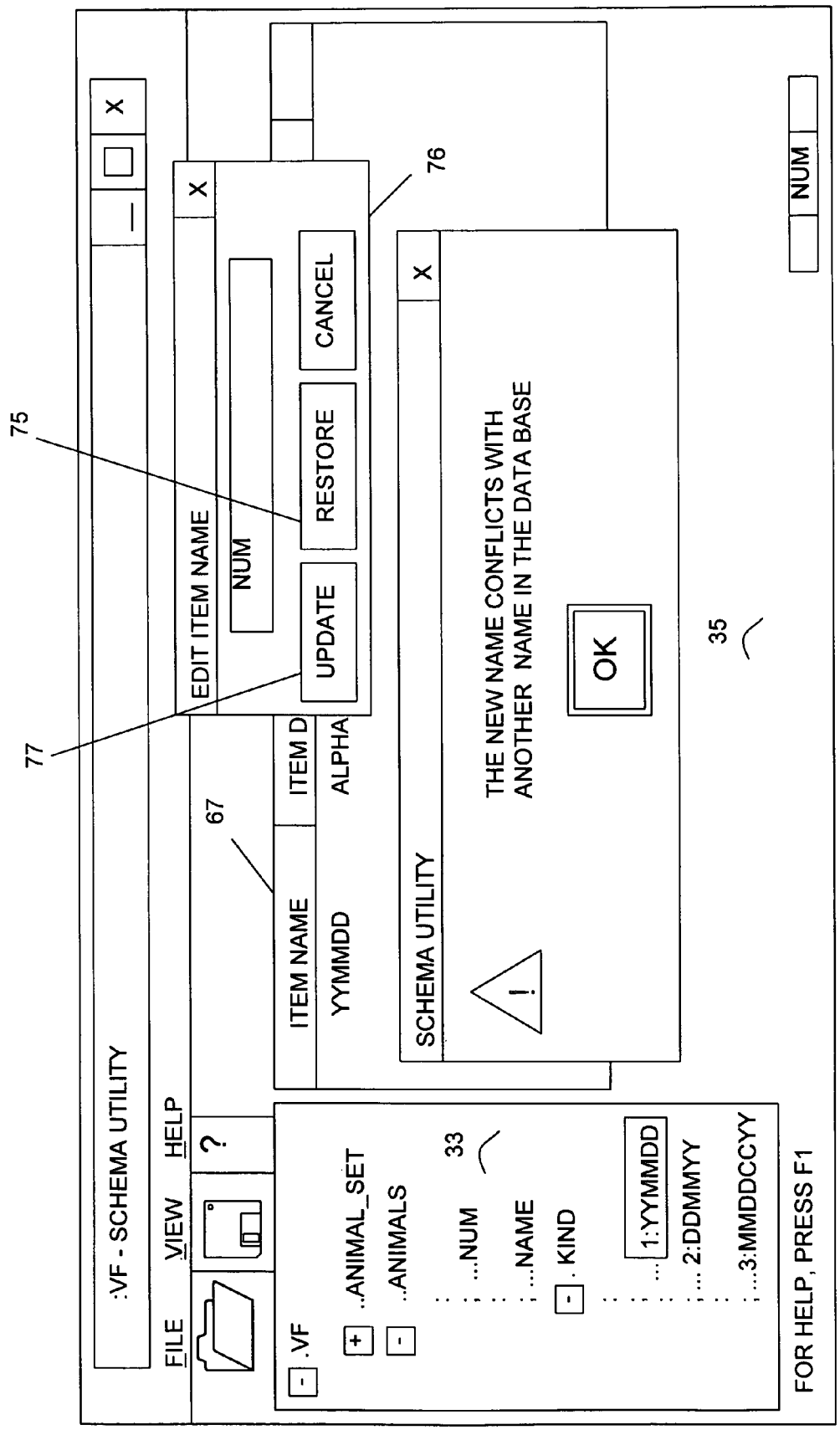
FIG. 9 illustrates the nature of a eighth display screen provided according to the preferred embodiment.

If the client selects the name of a data item in the tree view 33, then the Item Name or Item Type values can be modified. In the case of FIG. 9, the Item Name value "yymmdd" has been selected. FIG. 9 illustrates the situation where the client types in a new name "NUM" in a dialog box 76, but the new name conflicts with the name of another data item in the structure "animals". The conflicting new name cannot be selected. (Note that name comparisons are case insensitive.) After recognizing the conflict, the client then types a new name in the dialog box 76 that is acceptable.

The client restores a data item to its original value by first selecting the column heading or the current value in the column view. Then the client selects the restore button 75 (FIG. 9), and the Schema Utility 25 selects the original value from the list. When the client then selects the update button 77, the original "Item Name" value will be restored in col. 67.

Figure 10:
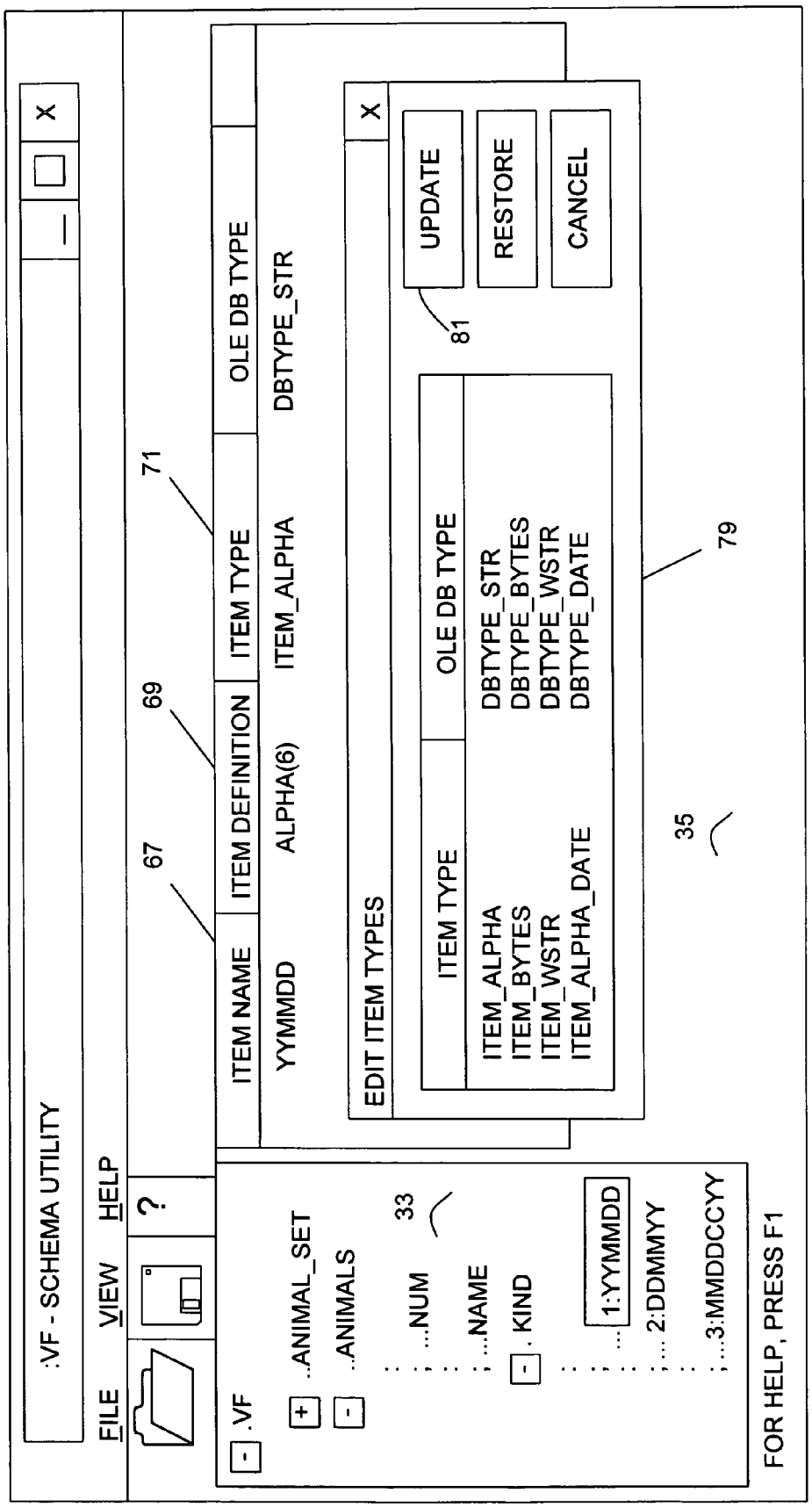
FIG. 10 illustrates the nature of a ninth display screen provided according to the preferred embodiment.

In the case illustrated in FIG. 10, an "Edit Item Types" dialog box 79 has been initiated. A box 79 may be initiated by selecting the Item Definition, Item Type, or OLE DB Type column headings 67, 69, 71 or one of the values underneath the headings. With respect to the FIG. 10, the client selects a new Item Type by selecting the new Item Name in the dialog box 79 and then selecting the update button 81.

Figure 11:
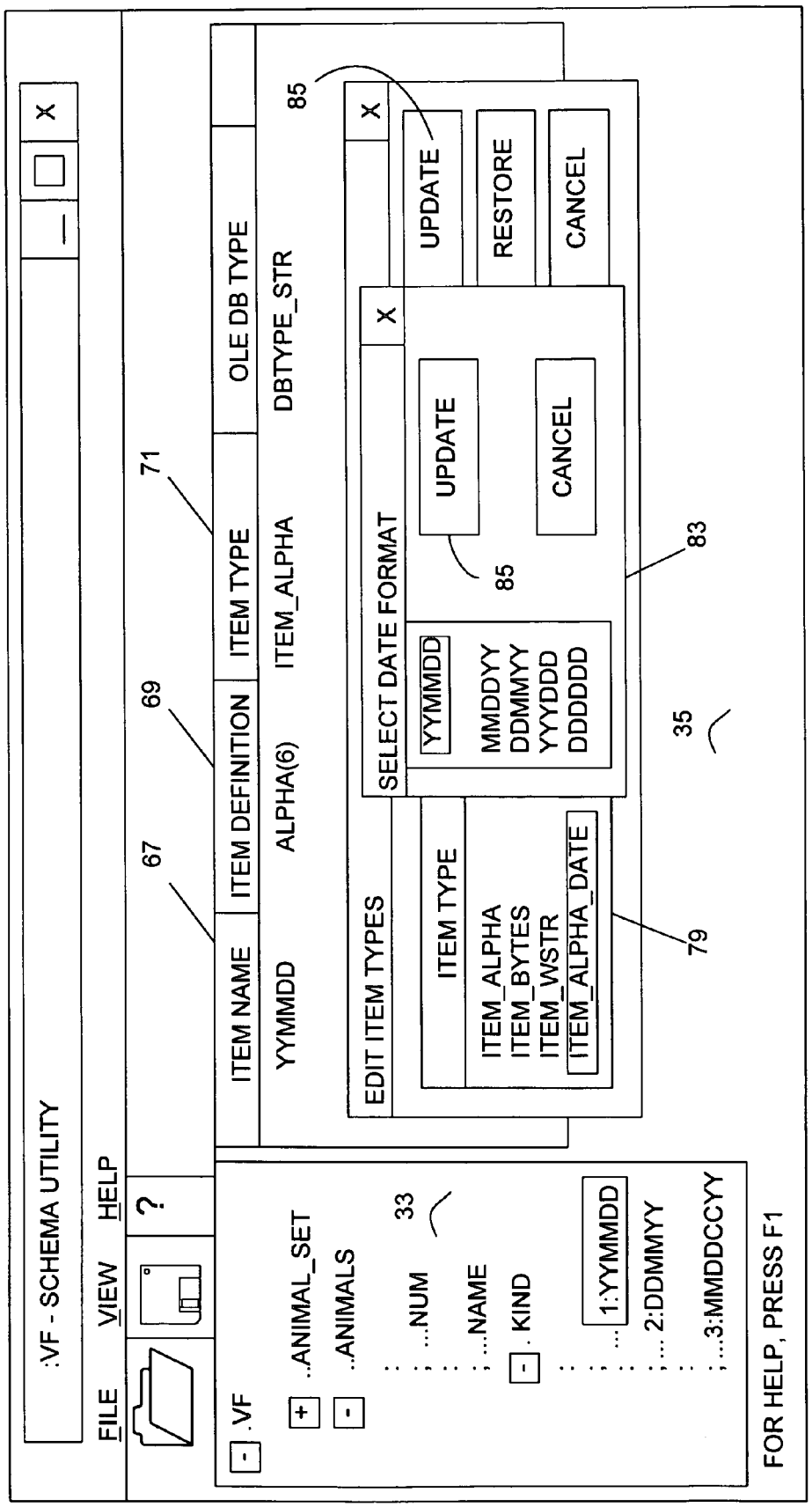
FIG. 11 illustrates the nature of a tenth display screen provided according to the preferred embodiment.
Figure 12:
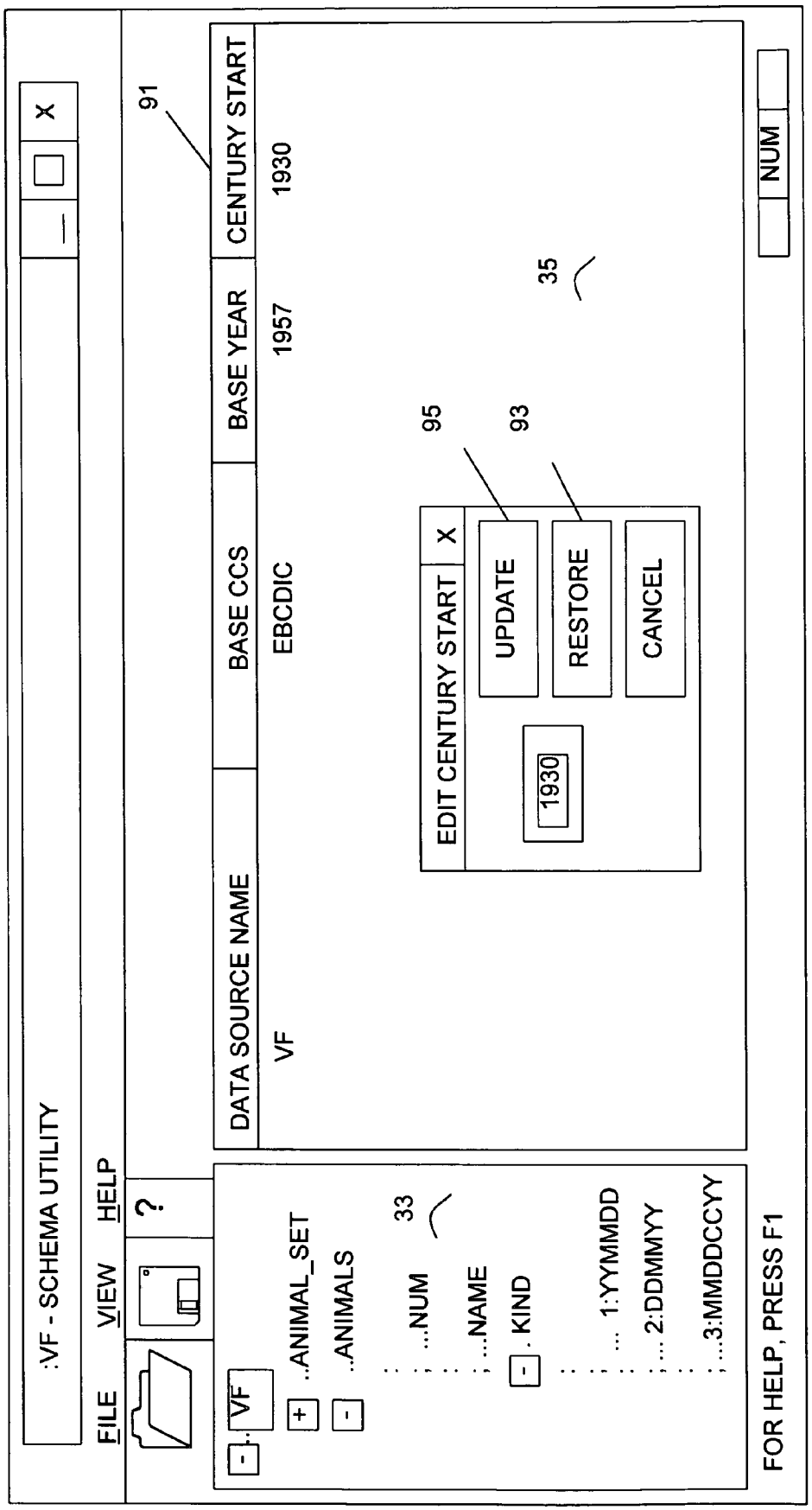
FIG. 12 illustrates the nature of a eleventh display screen provided according to the preferred embodiment.

In the case shown in FIG. 11, because item_alpha_date was selected, one additional selection must be made before the task is complete. In particular, the format of the date must be selected utilizing the automatically appearing dialog box 83.

When the date format is selected and the update button 85 pushed, the item is changed in the in-memory schema 31 and the column view 35 is updated so that the "Item Definition", the "Item Type" and the "OLE DB Type" are changed in the display, respectively, to "A-DATE(YYMMDD)", "item_alpha_date", and "DBTYPE_DATE".

The client restores a data item to its original value by first selecting the column heading or the current value in the column view. Thus, after button 85 has been pushed in FIG. 11, the Item Type value "item_alpha_date" could be selected, which causes a dialog box similar to box 79 to appear which presents the previous value, a restore button, and an "update button". To restore this value to the prior value "item_alpha", the client selects the restore button and the Schema Utility 23 selects the original value "item_value" from the list. When the client then selects the update button, the original Item Type value "item_value" will be restored.

If the client selects the name of the data source (the root node in) the tree view 33, then the Base Year or Century Start values can be modified. In the case illustrated in FIG. 12, the Century Start (col. 91) value "1930" has been selected. If the client changes the date to "1980", but then regrets it, the client may restore the date to "1930" by again selecting the Century Start column heading or the date value in the column view and then selecting the restore button 93. When the client then selects the update button 95, the original Century Start value will be restored.

Figure 13:
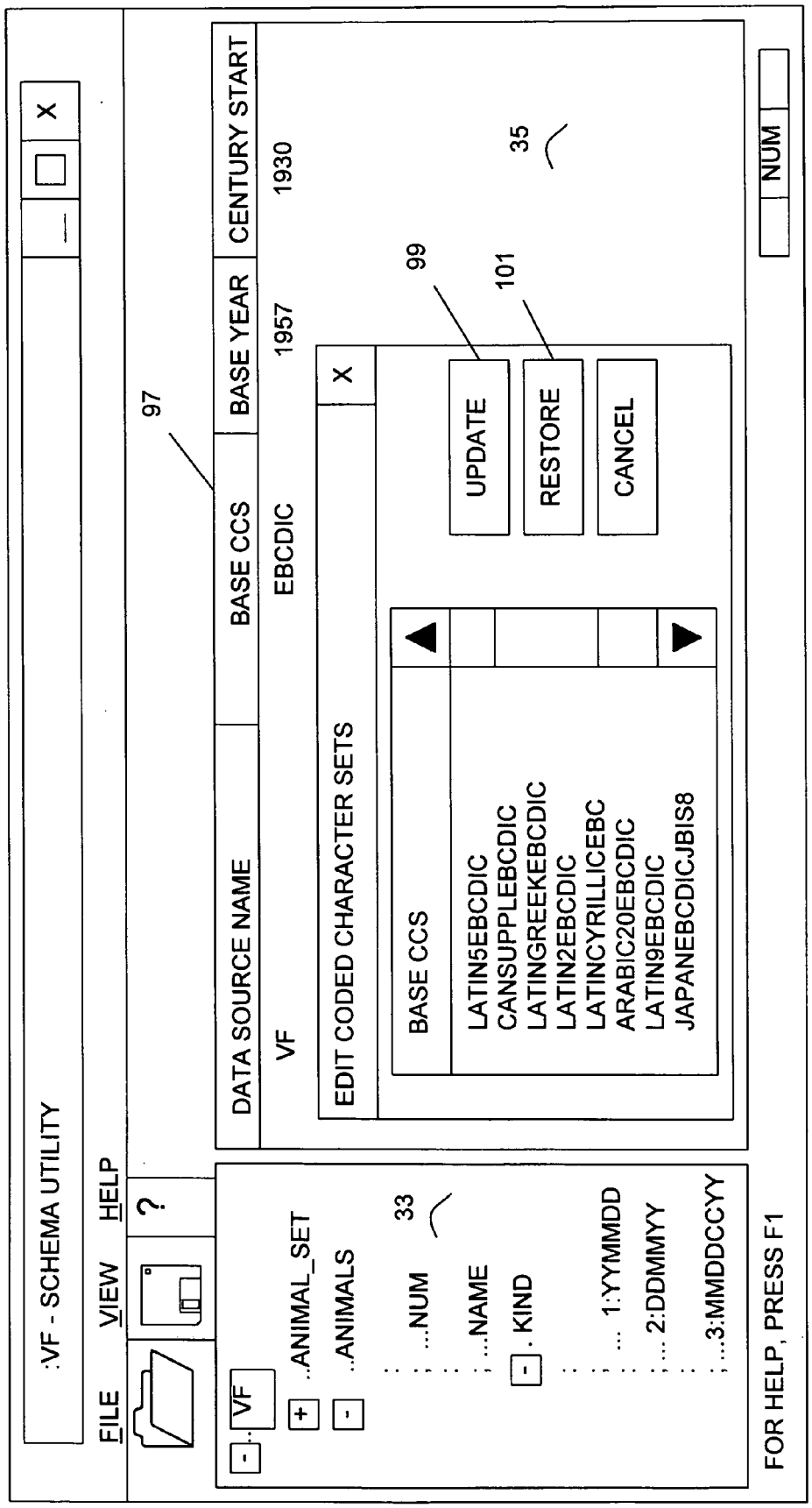
FIG. 13 illustrates the nature of a twelfth display screen provided according to the preferred embodiment.

If the client selects the name of the data source (the root node in) the tree view, then the Base Coded Character Set (and possibly the Double-Byte Coded Character Set) values can also be modified. In the case of FIG. 13, the Base CCS value "EBCDIC" has been selected by selecting the Base CCS column heading 97 or its value in the column view. The client may then select JAPANEBCDICJBIS8 and then the update button 99 to change the character set. To restore, the client again selects the Base CCS column heading 97 or its value in the column view, and then selects the restore button 101. When (or if) the client thereafter selects the update button 99, the original Base CCS value will be restored.

Figure 14:
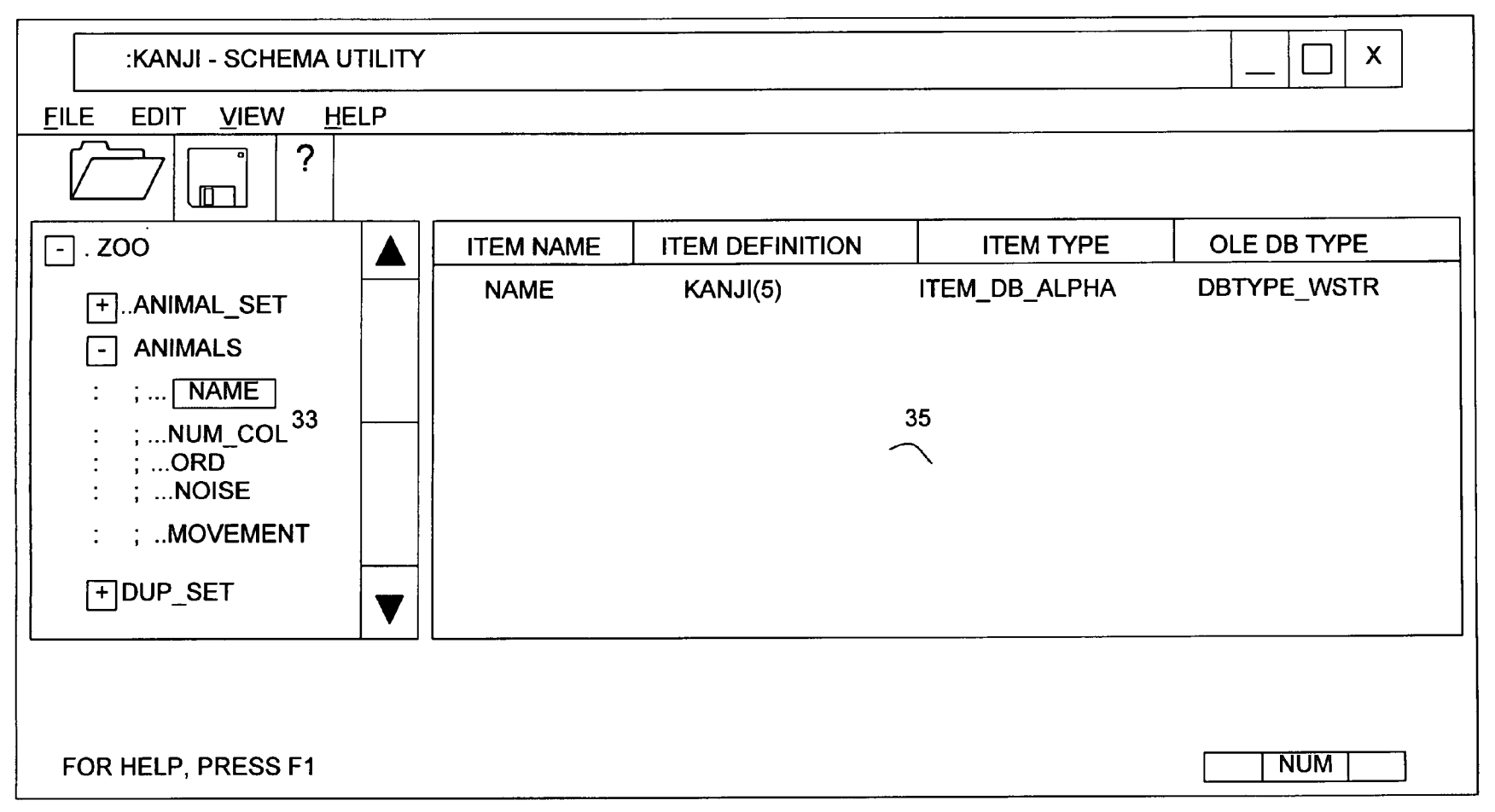
Figure 15:
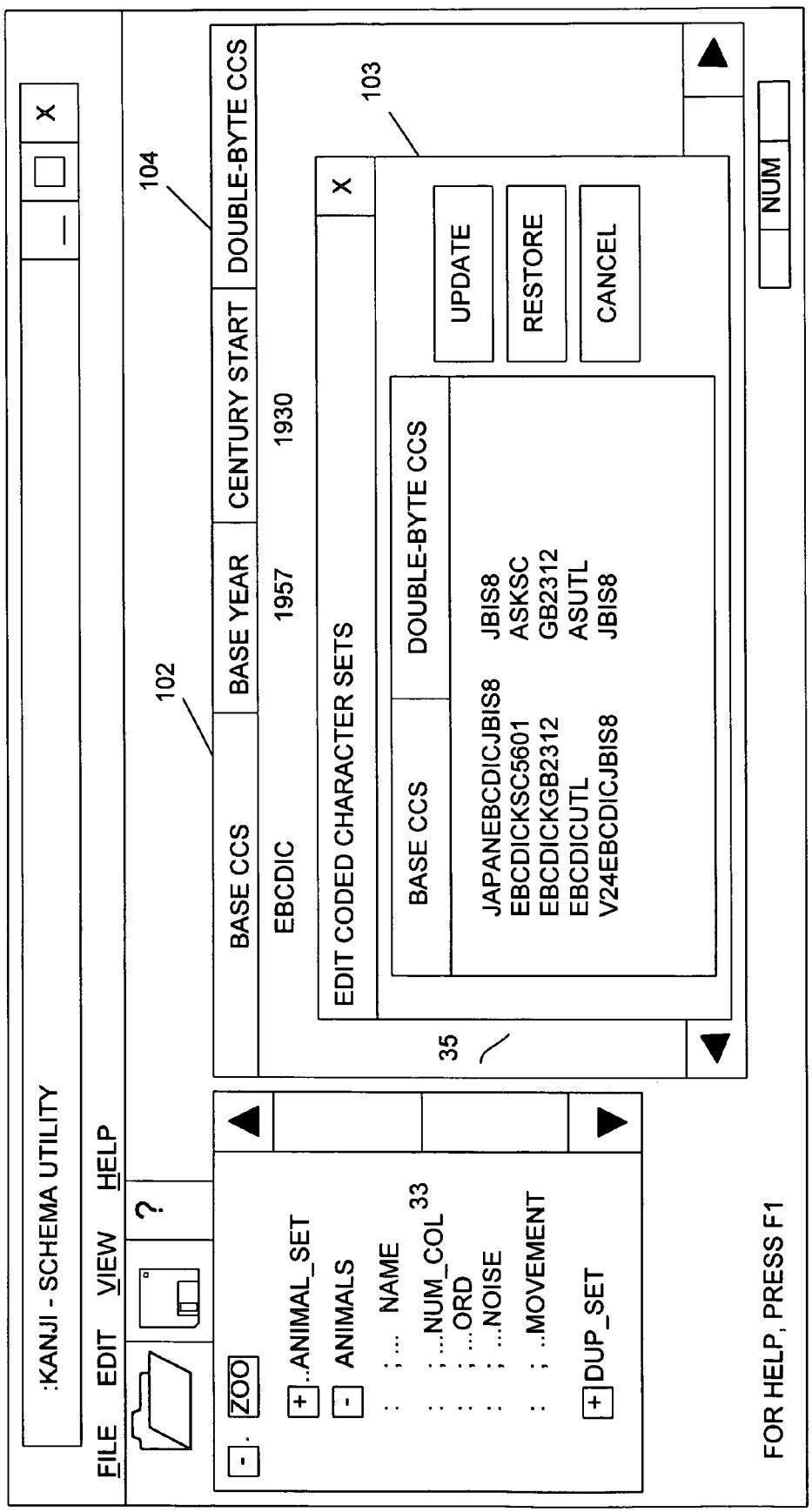
FIG. 15 illustrates the nature of a fourteenth display screen provided according to the preferred embodiment.

The schema illustrated in FIG. 14 has a double-byte alpha data item. At the root nodes, both Base CCS and Double-Byte CCS columns 102, 104 are displayed, as shown in FIG. 15. In the case of FIG. 15, the initial values do not correctly identify the coded character sets that are needed to support the alpha data in the data source. To correct this situation, either the Base CCS heading or its value EBCDIC or the Double-Byte CCS heading or the blank space under it is selected, resulting in display an Edit Coded Character Set dialog box 103, as shown in FIG. 15. The CCS values must be updated as a pair. Since the original values are not a member of the set of possible choices, no value has been selected as the default value by the Schema Utility 25. The update button is not available until a selection has been made. The client then selects JAPANEBCDICJBIS8 in the dialog box 103 and then selects the update button 105. As a result, both the Base CCS and the Double-Byte CCS column values are updated to "JAPANEBCDICJBIS8" and "JBIS8", respectively. If the client regrets his or her choice and selects either CCS column heading or value in the column view, the Edit CCSes dialog will reappear. In this case, the restore button is not available because the original values were not valid for a schema with double-byte alpha data. If the client tries to close the Schema File without fixing the problem with the CCSes, the Schema Utility displays an error message.

FIGS. 16–22 further illustrate the operation of the Schema Utility 25 during an edit session according to the preferred embodiment. In step 201 of FIG. 16, the Schema Utility reads the schema file, and in step 202 creates the in-memory unmodifiable schema object and working copy (modified) schema object. In the next step 203, the Schema Utility populates the tree view display 33 with the working copy schema elements. Next in step 204, the column view 35 is initialized with the attributes of the data source. The program next proceeds along path 205 to handle user-selected modifications to the schema in step 206. A test 207 is then performed to determine whether the user wishes to save the modifications. If so, the program proceeds along path 209 to create a new dual schema file from the unmodifiable schema object and the working copy schema object as modified. The utility is exited once the new schema file is created, or if the user indicates that the modifications are not to be saved.

Figure 16:
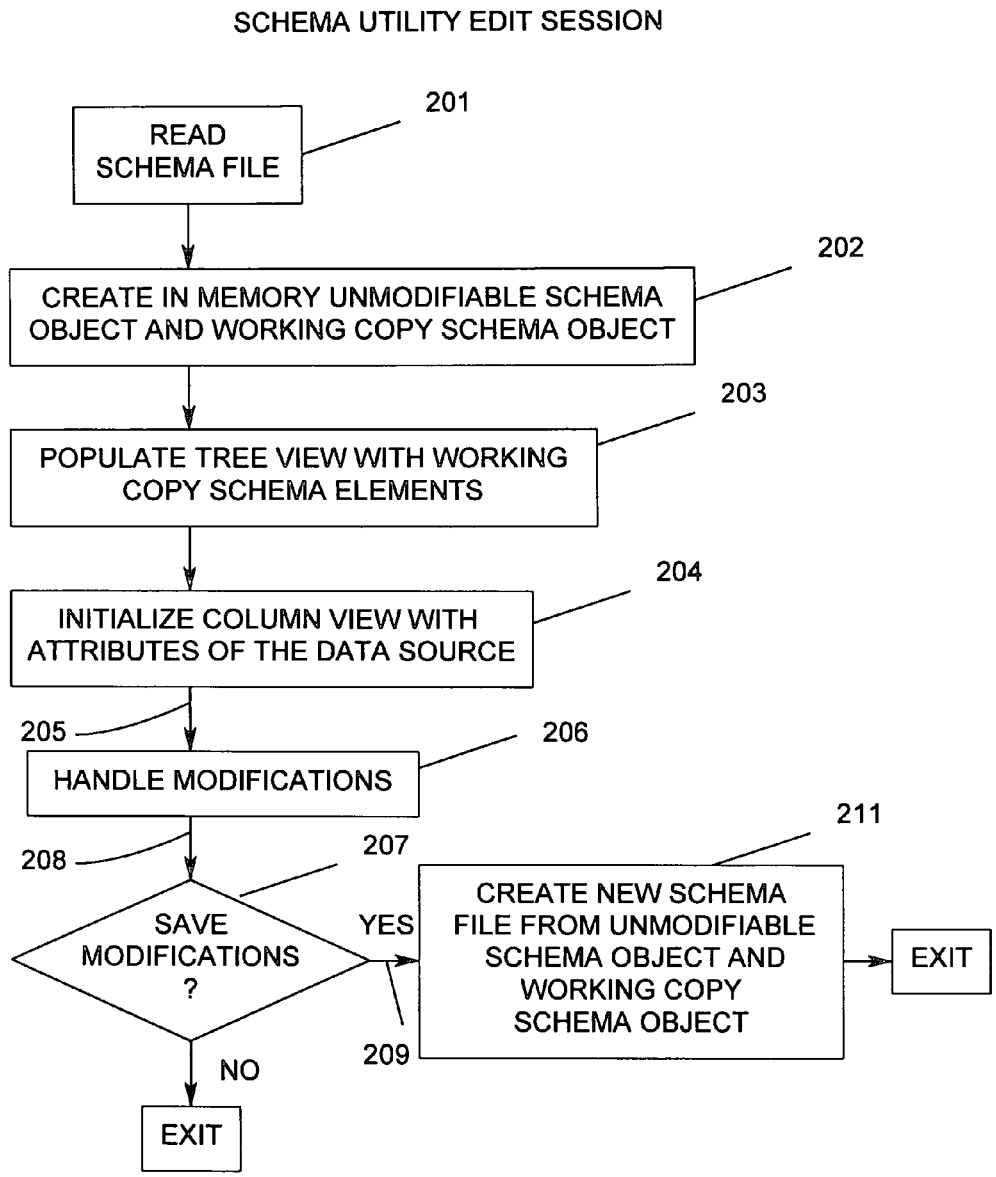
FIGS. 16–22 are flowcharts illustrative of the structure and operation of a schema utility according to the preferred embodiment.
Figure 17:
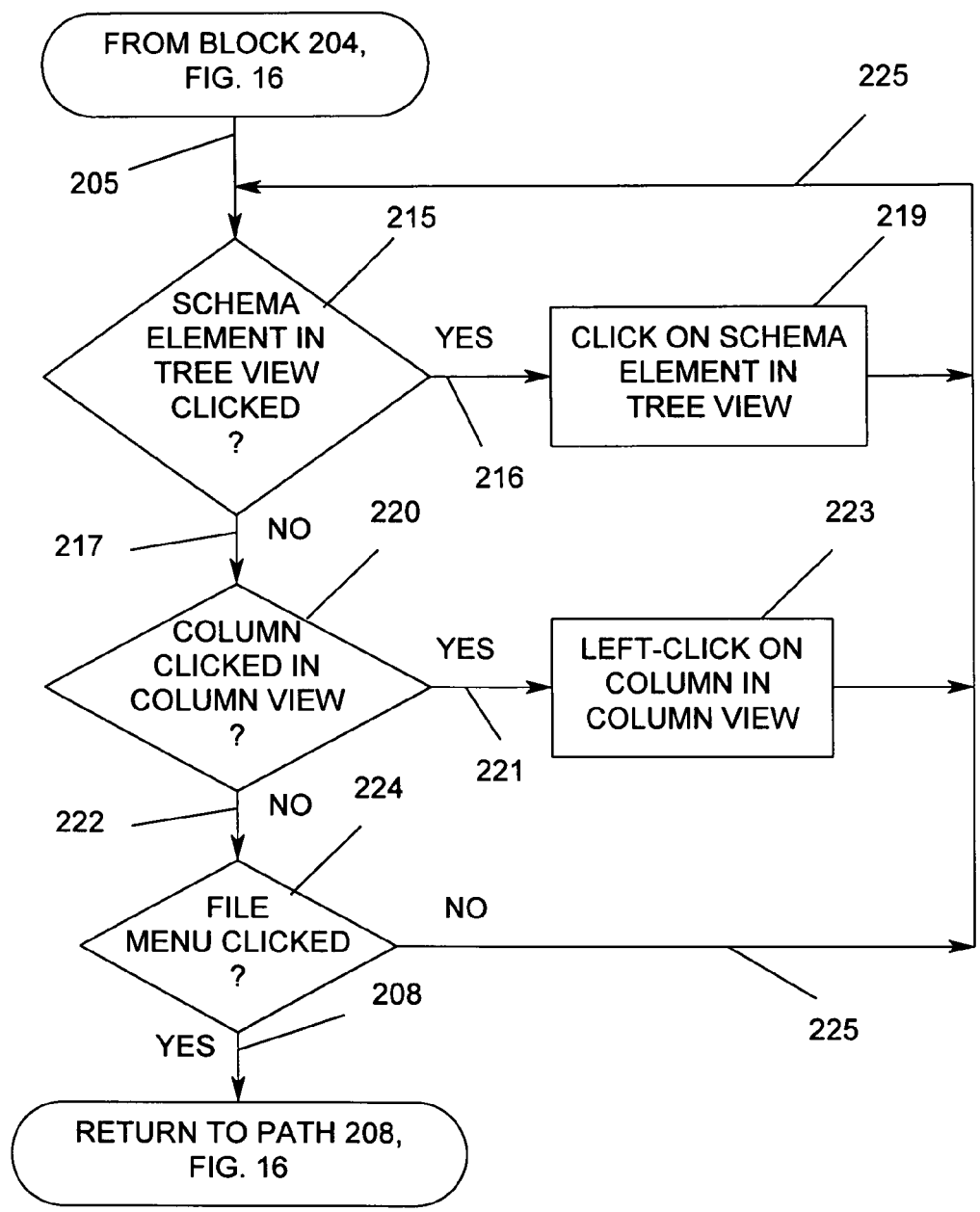

FIG. 17 further delineates steps performed during the "handle modifications" step 206 of FIG. 16. In step 215 of FIG. 17, a test is performed to determine whether the user has clicked on a schema element in the tree view 33. If so, the flow proceeds along path 216 to step 219 where the program responds to the user's request to modify a tree view schema element. If the user has not clicked on a schema element in the tree view 33 in step 215, the program proceeds along path 217 to test 220 where it is determined whether the user has clicked on a column in the column view 35. If so, the flow proceeds along path 221 to step 223 where the user's desired modifications are processed. If a column has not been clicked in the column view 35, the flow proceeds along path 222 to test 224 to determine whether the user has clicked on the file menu. If so, the flow proceeds to test 207 of FIG. 16. If not, path 225 is followed whereby the program loops back to the beginning of the "handle modification" step via path 205.

Figure 18:
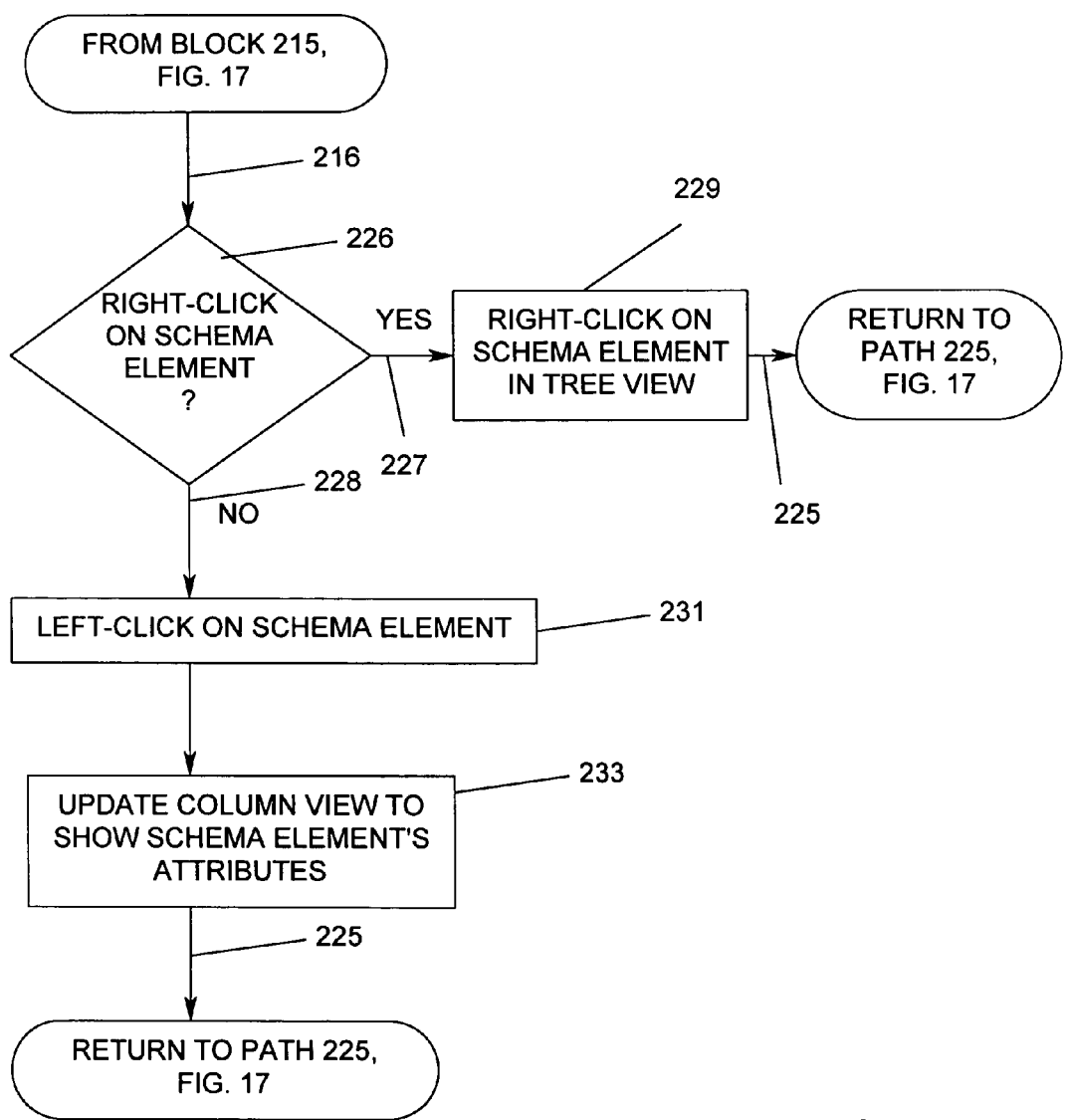

FIG. 18 illustrates further steps performed in step 219 of FIG. 17. Thus, if a schema element in the tree view 33 has been clicked upon, a test 226 is performed to determine whether it was a right click. If so, the flow proceeds along path 227 to perform a number of steps 229 to accomplish user-desired modification. If the click was a left click, the flow proceeds along path 228 through steps 231, 233 to update the column view to show the selected schema element's attributes.

Figure 19:
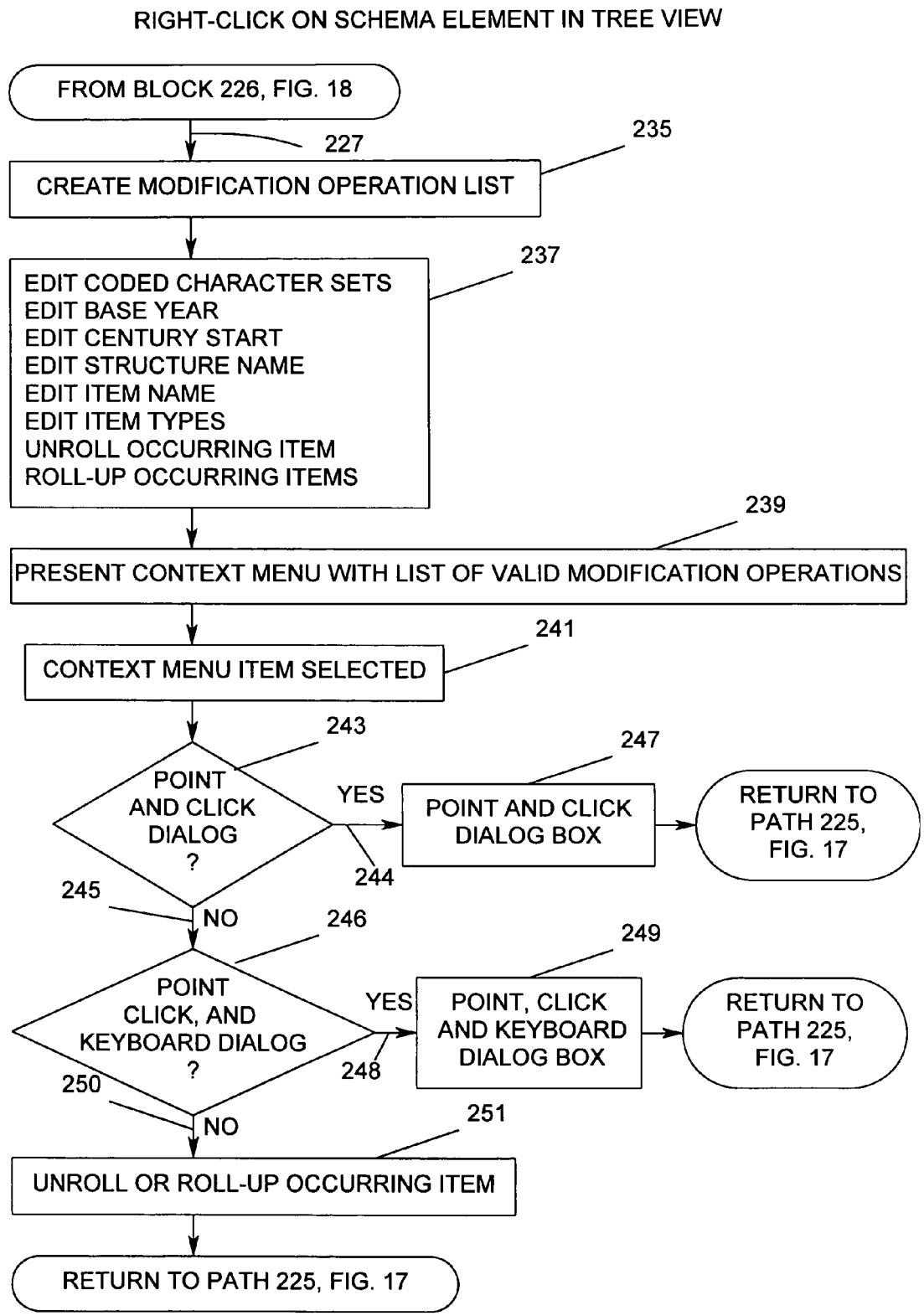

FIG. 19 further illustrates the steps 229 performed in response to a right click on a schema element in the tree view 33. Steps 235, 237 and 239 represent the creation of a list of modification operations which may validly be performed with respect to the "clicked-on" schema element from a table 237 of possible operations. In step 239, the list of valid operations is displayed to the user in the form of a "context menu".

In step 241 of FIG. 19, if an item has been selected on the context menu for modification, a test 243 is performed to determine whether the modification operation requires a point and click dialog box. If so, the flow proceeds along path 244 to the point and click dialog box handling steps 247. If not, the flow proceeds along path 245 to test whether the user selected modification requires a point, click and keyboard entry dialog box at test 246. If so, the flow proceeds along path 248 to steps 249 to process the dialog operation requiring keyboard input. If the test 246 is not satisfied, the flow proceeds along path 250 to step 251 where the operation takes place without further client interaction.

Figure 20:
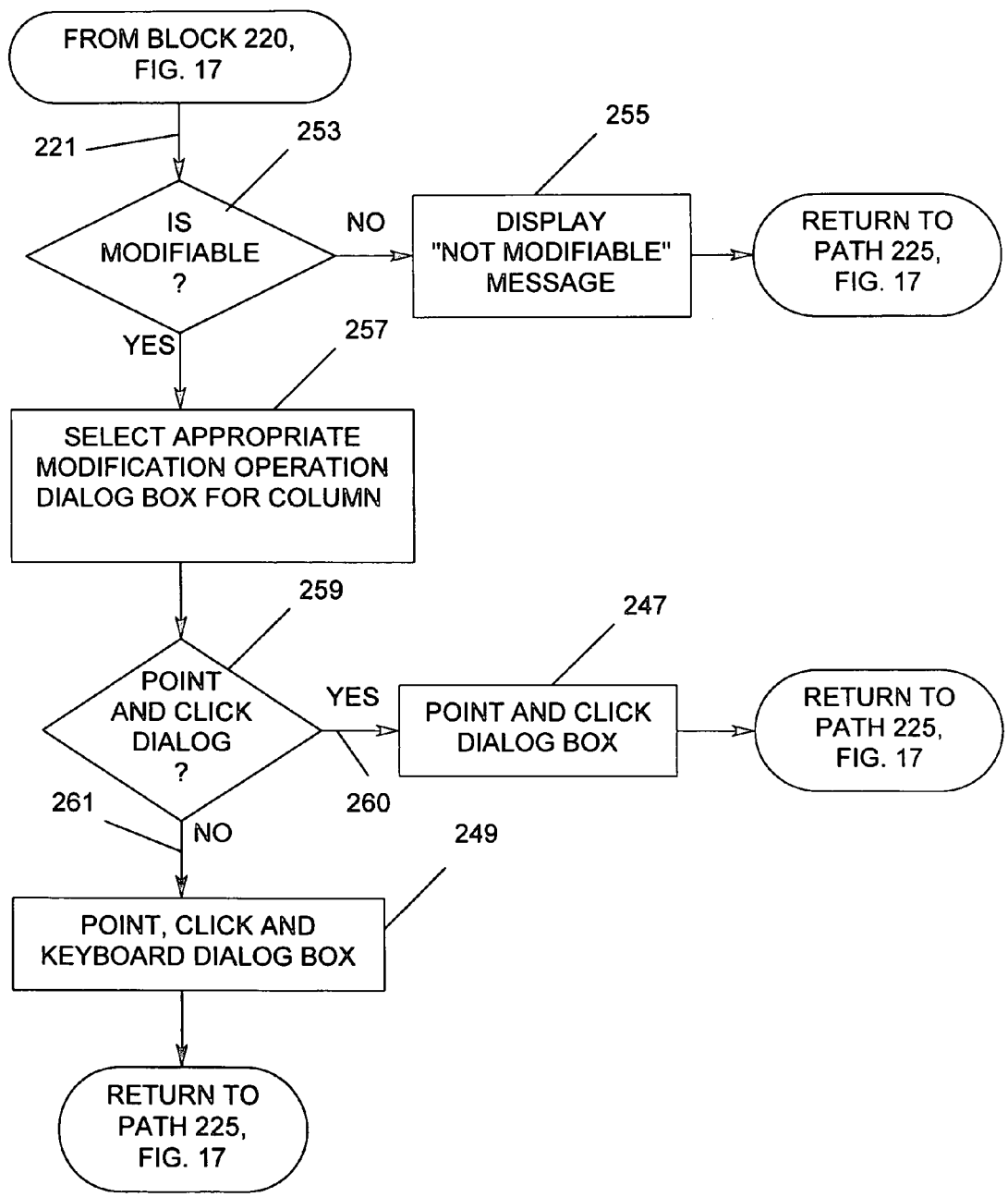

FIG. 20 illustrates the steps performed in response to a left click on a column executed in step 220 of FIG. 17. First, a test 253 is performed to determine whether the column item clicked on is modifiable. If not, step 255 is performed to display a "not modifiable" message to the user. If the item is modifiable, the flow proceeds to step 257 wherein the program selects the appropriate modification operation dialog box. A test 259 is then performed to determine whether the dialog box selected is a point and click dialog box. If so, the flow proceeds along path 260 to the point and click dialog box procedure 247 illustrated in FIG. 21. If a point and click dialog box is not required, the flow proceeds along path 261 to the point and click and keyboard input dialog box procedure 249 further illustrated in FIG. 22.

Figure 21:
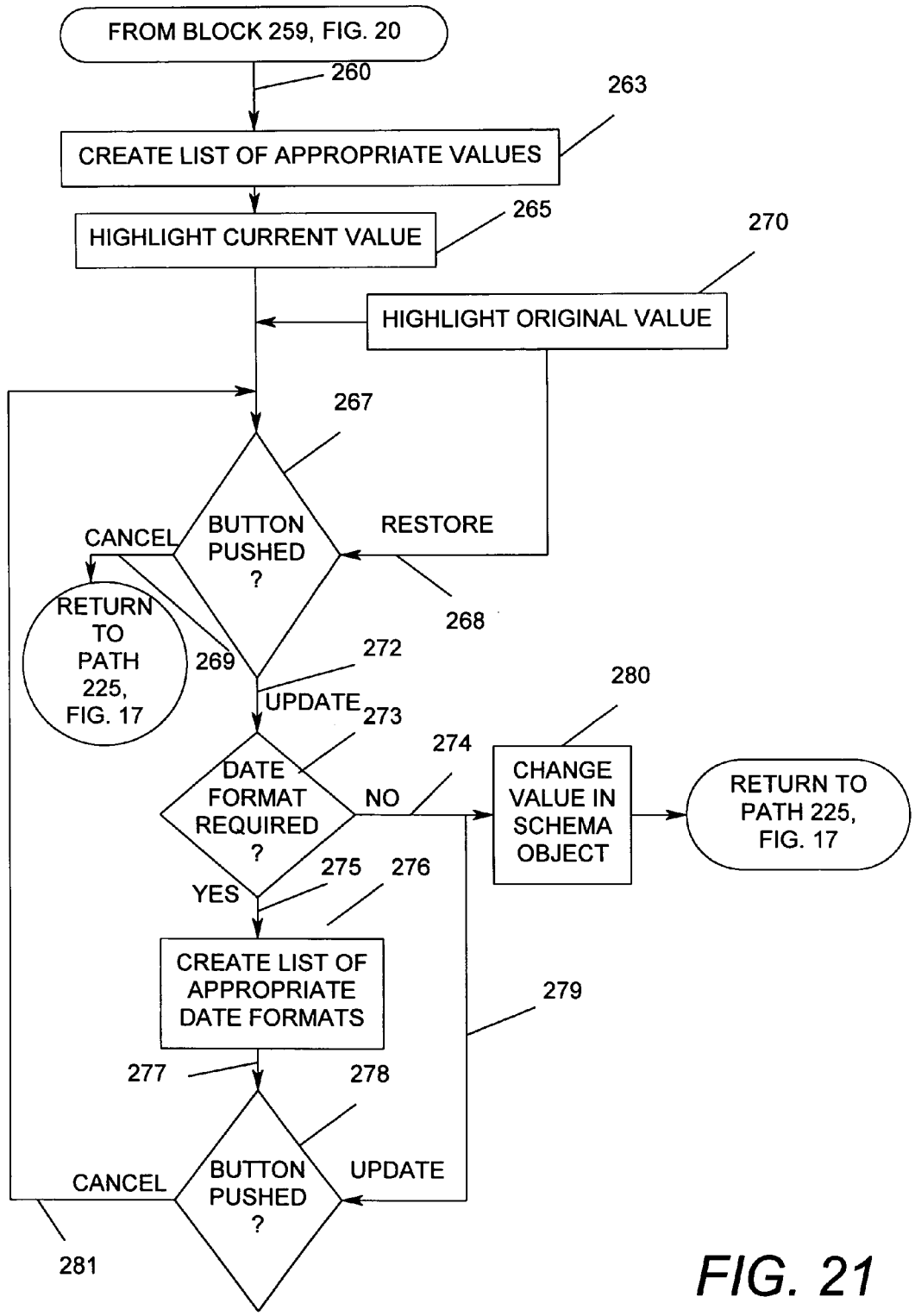

If a point and click dialog box is required, the steps of FIG. 21 are performed. In steps 263 and 265, the program creates a list of appropriate values for the item selected to be modified and highlights the current value of that item. A test 267 is then performed to determine whether the user has selected one of the "update", "restore" or "cancel" buttons on the screen display, e.g., such as FIG. 10. If "restore" has been selected, the program proceeds along path 268 to highlight the original value and then returns to test 267. If "cancel" has been selected, path 269 is followed and the program returns to path 225 on FIG. 17. If the user has selected a new value and presses the update button, path 272 is followed to a test 273 wherein it is determined whether a date format needs to be selected. If so, the flow proceeds along path 275 to provide a list of appropriate date formats in step 276 and then to detect whether a button has been pushed in test 278, either updating the date format or canceling the operation. If the operation has been cancelled, the program follows path 281 back to test 267.

If either no date is required in test 273 or the update button is determined to have been pushed in test 278, the program proceeds to step 280 via paths 274 or 279, respectively. In step 280, the value of the item in the schema object is changed to the new value selected by the user and the program then returns to path 225 on FIG. 17.

Figure 22:
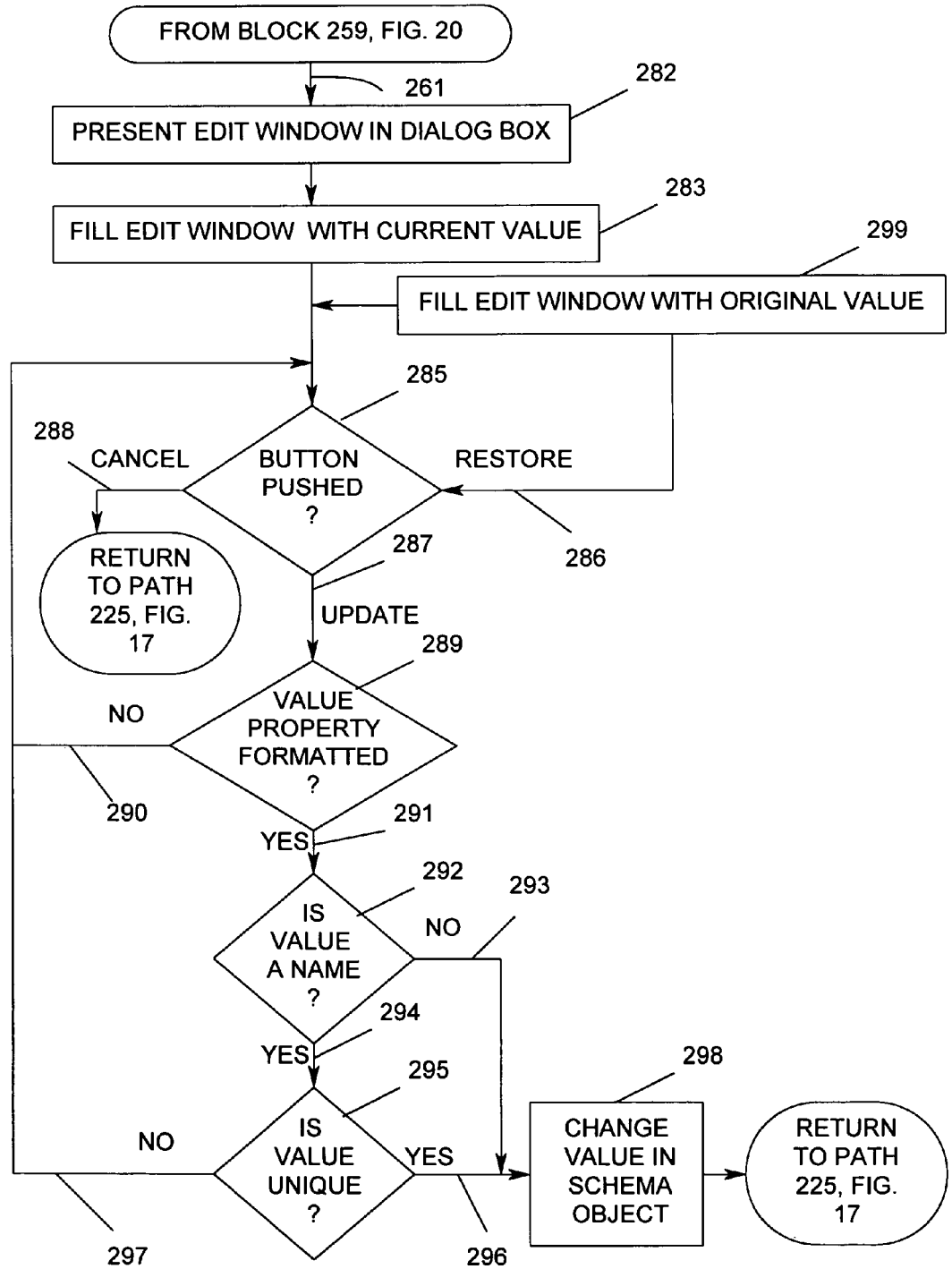

FIG. 22 illustrates the steps followed when a point, click and keyboard entry dialog box is required. In steps 282 and 283, the edit window dialog box is displayed, and the edit window itself is filled with the current value of the item selected for modification. The user may then type in a new value in the edit window and select either "cancel", "restore" or "update". Test 285 is performed to determine which of these operations the user has selected. If the user selected "restore", path 286 is followed and the edit window is filled with the original value as it existed prior to the user modification, step 299. If "update" is selected, path 287 is followed, and a test is performed to determine whether the new value typed into the edit window by the user is properly formatted. If the value is not properly formatted, path 290 is followed back to test 285. If the value is properly formatted, a second test 292 is performed to determine whether the value entered by the user is a name. If the value is not a name, the value in the schema object is changed to the new value typed in by the user in step 298. If the value is a name, a third test 295 is performed to determine whether the name selected by the user is unique within the schema element's context. If the name is unique, the value in the schema object is changed to the new value typed in by the user in step 298. If not, path 297 is followed back to test 285.

Figure 23:
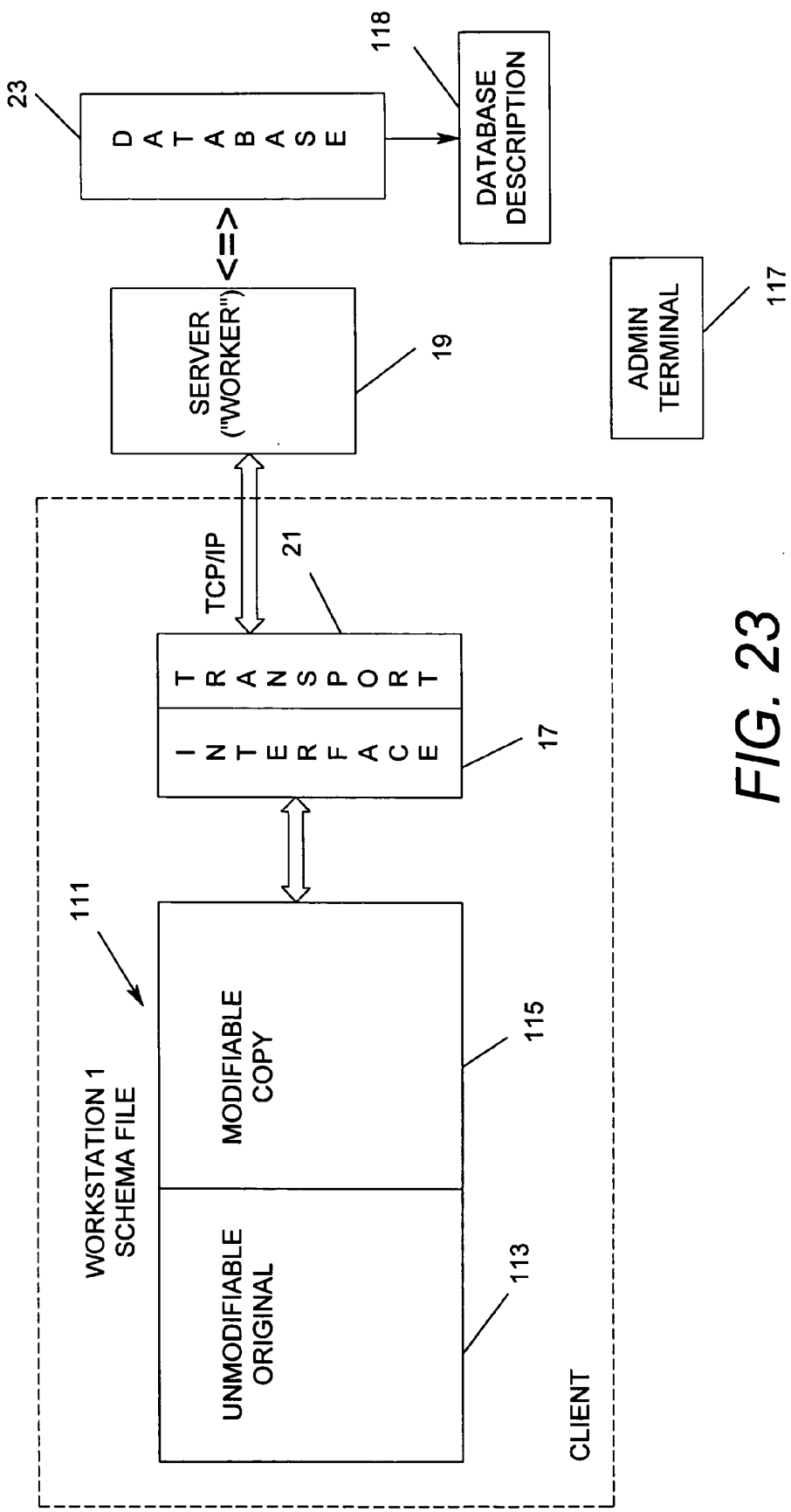
FIG. 23 is a system block diagram illustrating further aspects of a system wherein the preferred embodiment finds application.

The manner in which schema updates are handled will now be discussed further in connection with FIG. 23. Initially, at the request of an OLE DB client on the workstation, the Interface Layer 17 establishes communication with the worker 19. The worker 19 opens the database and sends a copy of the database description to the Interface Layer. The Interface Layer converts the server side database description into a dual Schema File 111, as shown in FIG. 23, which contains an unmodifiable copy 113 and a modifiable copy 115 of the schema. Preferably the dual Schema File contains a "time stamp", which indicates the last time the server side database description was modified. The worker checks this time stamp and, after the initial transmission of the database description 118, will only send a copy of the database description to the Interface Layer if the server side database 23 has been reorganized.

Figure 24:
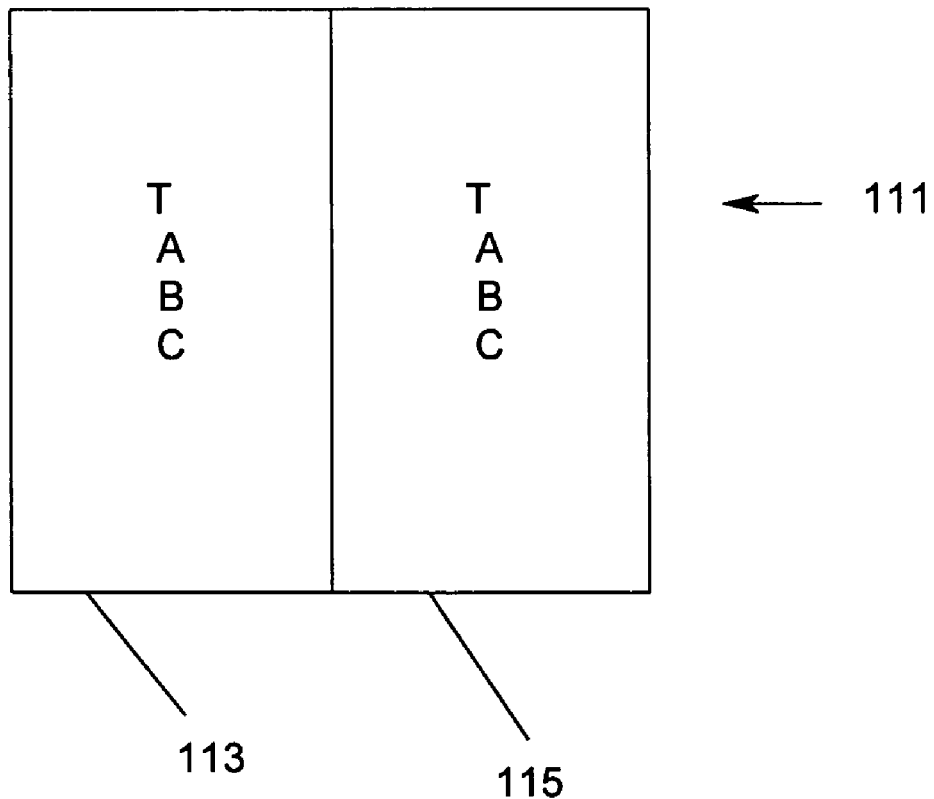
FIG. 24 illustrates a work station schema file according to the preferred embodiment.

As an example, a user may desire to edit data items in the Schema File 111 to add longer names. Suppose the data items are expressed as:

T
   A
   B
   C

Where "T" is a table name and "A", "B", and "C" are data items. At this point, the workstation Schema File 111, as initially created, includes the same contents in both the original and modifiable areas 113, 115, as shown in FIG. 24. Now, the user may open the Schema File 111, which retrieves it from disk 27 to local memory 31. Next, the user edits the schema such that the modifiable copy 115 now reads:

Table
   Apple
   Boy
   Cat

These names may be characterized as being "more meaningful" to the user. To complete the operation, the user executes a "Save" operation, which updates the "modifiable" copy of the schema in the dual Schema File on disk 27. The modified version of the schema is used the next time the user accesses the database, and the data items will be presented with their new names.

The following tables identify specific data type mappings supported by the Schema Utility of the preferred embodiment. In particular, the prior art database description identifies the following data types, which are given default mappings to OLE DB data types.

| Database Description DASDL construct | Schema File data type | OLE DB data type |
|---|---|---|
| ALPHA | item_alpha | DBTYPE_STR |
| REAL(Sp) | item_integer | DBTYPE_I1, _I2, _I4, _I8 |
| REAL(p) | item_us_integer | DBTYPE_UI1, _UI2, _UI4, _UI8 |
| NUMBER(S) | item_packed | DBTYPE_NUMERIC |
| NUMBER | item_us_packed | DBTYPE_NUMERIC |
| REAL(Sp,s) | item_fixed | DBTYPE_NUMERIC |
| REAL(p,s) | item_us_fixed | DBTYPE_NUMERIC |
| REAL | item_real | DBTYPE_R8 |
| BOOLEAN | item_Boolean | DBTYPE_BOOLEAN |
| FIELD | item_field | DBTYPE_UI1, _UI2, _UI4, _UI8 |
| GROUP | grouped_item | DBTYPE_BYTES |
| TYPE | item_record_type | DBTYPE_UI1 |
| ALPHA with CCSVERSION = KANJI | item_db_alpha | DBTYPE_WSTR |

The prior art database description contains the following data types, which might be legitimately mapped to the following OLE DB data types, but the database description does not contain enough information to explicitly support the mapping. The Schema Utility is available to assign these mappings on an item-by-item basis. The Schema Utility only displays options for selections that are valid for the data item.

| Database Description DASDL construct | Schema File data type | OLE DB data type |
|---|---|---|
| ALPHA Non-character data | item_BYTES | DBTYPE_BYTES |
| ALPHA Even number of bytes | item_WSTR | DBTYPE_WSTR |
| ALPHA Size between 5 and 8 bytes | item_alpha_date | DBTYPE_DATE |
| NUMBER(S) Size between 5 and 8 digits | item_packed_date | DBTYPE_DATE |
| NUMBER Size between 5 and 8 digits | item_us_packed_date | DBTYPE_DATE |
| REAL(p) Size between 5 and 8 digits | item_integer_date | DBTYPE_DATE |
| REAL(Sp) Size between 5 and 8 digits | item_us_integer_date | DBTYPE_DATE |
| REAL(Sp,s) Size between 5 and 8 digits | item_fixed_date | DBTYPE_DATE |
| REAL(p,s) Size between 5 and 8 digits | item_us_fixed_date | DBTYPE_DATE |
| ALPHA with CCSVERSION = KANJI Non-character data | item_BYTES | DBTYPE_BYTES |
| ALPHA with CCVERSION = KANJI UCS2NT character data | item_WSTR | DBTYPE_WSTR |

If the data type selected maps to DBTYPE_DATE, the Schema Utility requires that the date format also be selected. Depending upon the size of the data item (5, 6, 7, or 8 characters or digits) the following formats are presented for selection.

| Size | Format |
|---|---|
| 5 | YYDDD |
| 5 | DDDYY |
| 6 | YYMMDD |
| 6 | MMDDYY |
| 6 | DDMMYY |
| 6 | YYYDDD |
| 6 | DDDDDD |
| 7 | CCYYDDD |
| 7 | DDDCCYY |
| 8 | CCYYMMDD |
| 8 | MMDDCCYY |
| 8 | DDMMCCYY |

Details of the preferred architecture of the Schema Utility 25 will now be discussed. As noted above, the Schema Utility 25 uses Microsoft Foundation Classes to implement a simplified Document-View architecture. It is a simplified Document-View architecture, because it does not use the document object. The frame object (CMainFrame) manages the file handing code (Open, Save, etc.) and is the owner of the splitter window control that initiates the tree and list view objects (CSchemaTreeView and CSchemaListView, respectively) that fill the client window with data. Pointers to all three objects are stored globally so that the independent objects can coordinate actions among themselves. There is also a globally stored pointer to the schema object (CDatabaseSchema), the in-memory copy of the Schema File, so that all of the other objects can have access to the schema data.

The main task of the CMainFrame object is the handling of the File menu. The support of Open and SaveAs is done through the use of common dialog, CFileDialog, objects. The maintenance of the "dirty bit", indicating that the data in the schema has been updated is shared among the frame object and the list view object. If the schema has been updated, the frame object asks the client whether or not the data should be saved before any Close or new Open request is initiated. When the frame object opens a new Schema File, it calls methods shared with the Interface Layer to read the schema into memory. When the frame object saves the schema data, it again calls a procedure shared with the Interface Layer to move the data out of memory and back to disk. Whenever a Schema File is opened or closed, the frame object calls an exported method in the tree view object (NewSchemaFileOpen), so that the view can be updated.

The main task of the CSchemaTreeView object is the presentation of the schema in the tree view format. As it is stepping through the schema data and initializing the tree view control, it creates a global TreeItems structure that is used to simplify the coordination of the tree and list views. The tree view moves up a level when it displays the structures in the database, the items in a structure, the items in a group item, the items in a field item, etc.

Whenever an item in the tree view is selected, the tree view object calls an exported method of the list view object (TreeViewSelected), passing the index of the TreeItems structure that describes the item, so that the list view object can update its column view. The CSchemaListView object displays the details of the selected schema item. The presentation changes depending upon the type of item that was selected in the tree view.

The list view object also controls the editing functions of the Schema Utility. If the client selects the Structure Name or Item Name column heading or the name itself, the list view object initiates the CEditName dialog. If the client selects the Item Definition, Item Type, or OLE DB Type column heading or selects one of their values, the object initiates the CEditItem dialog. If the client selects the Base Year or Century Start column heading or its value, the object initiates the CEditCentury dialog. If the client selects the Base CCS (or if available, the Double-Byte CCS) column heading or its value, the object initiates the CEditCCSes dialog.

From the foregoing discussion, it will be appreciated that the Schema Utility of the preferred embodiment provides a number of useful functions and features. First, it presents the data source schema in a format that a user of the prior art DMSII data source would expect and be familiar with. It also allows the client to modify names and initial values via data entry in an edit box. The changes are validated before they are accepted by the Schema Utility.

The Schema Utility particularly allows the client to refine the mapping between a data source's data item and an OLE DB item type via point and click selection from a list. Only valid selections are offered by the Schema Utility and help text may be made available to explain the difference between each choice. For example, if the data item to be modified could potentially contain a date, the list of choices includes Item Types that describe the different, supported date formats. If a data item of type alpha containing an odd number of bytes is selected for modification, none of the double-byte character Item Types will be available in the list of choices. In the preferred embodiment, schema names can be only 30 characters long, so the length of the new name is also tested before a change is made.

The Schema Utility further allows the client to see the original values of data source schema items if they have been modified, and every change can be undone. None of the changes to the Schema File affect data in the data source. The changes are all designed to make the presentation of the data by the Unisys Data Provider more meaningful to the client.

As those skilled in the art will appreciate, the methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

From the above description, those skilled in the art will further appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. In a system wherein a data source schema describes structures and data items, with their data types, relating to the organization of data in a server side data source, said structures and data types having been mapped into a set of OLE DB structures and data types recognized by a client, the client being arranged to access the data source via an OLE DB data provider, a method for completing the mapping of the server side data source into the OLE DB model and localizing the names of the data source structures and data items comprising the steps of:
   maintaining a dual Schema File at a client side terminal, said dual Schema File containing an original copy of the data source schema and a modifiable copy of the data source schema;
   displaying the modifiable copy of the data source schema from the dual Schema File in a split window format including one window which provides a tree view of the schema structure and an adjacent window which displays a set of values related to a selected element of the tree view; and modifying one of said values, at least in part in response to a user executed point and click operation; and
   responding to a user executed point, click, and data entry operation to modify one of the said values.

2. The method of claim 1 wherein organization of the data source is visually represented by a display in said tree view window.

3. The method of claim 2 wherein said tree view includes a top view root node containing a data source name and a second level listing structures defined for the data source.

4. The method of claim 2 wherein subordination in said tree view at a level three and below indicates accessible data items collected together and accessible as a group.

5. The method of claim 2 wherein number-colon pairs preceding data items appearing in said tree view indicate a format number of one of a plurality of variable format data types.

6. The method of claim 2 wherein numbers surrounded by square brackets following data items appearing in said tree view indicate a number of repetitions of occurring data items.

7. The method of claim 1 wherein the type of modification to be made to an element of the data source schema is selected by right-clicking on said element's name in said tree view.

8. The method of claim 7 wherein, upon right-clicking on a selected one of said element's name, a context menu drops down to facilitate the selection of a modification operation.

9. The method of claim 8 wherein said context menu displays a set of user-selectable modification operations.

10. The method of claim 9 wherein said set of modification operations contains only valid choices for said selected data source schema element.

11. The method of claim 10 wherein said set includes a modification operation that comprises changing the identification of the data source character set.

12. The method of claim 10 wherein said set includes a modification operation that comprises changing the base year in a date format.

13. The method of claim 10 wherein said set includes a modification operation that comprises changing the century window for date formats containing two digit years.

14. The method of claim 10 wherein said set includes a modification operation that comprises changing the name of a schema element to one more meaningful to the user.

15. The method or claim 10 wherein said set includes a modification operation that comprises changing the mapping between a server side data source data item and an OLE DB item type.

16. The method of claim 10 wherein said set includes a modification operation that comprises flattening an occurring data item into a sequence of named data items.

17. The method of claim 10 wherein said set includes a modification operation that comprises returning a flattened sequence of named data items back into its original occurring data item format.

18. The method of claim 10 wherein, upon clicking on a selected one of said modification operations a dialog box drops down to facilitate selection of a new value.

19. The method of claim 18 wherein said dialog box displays a set of choices which may be selected for said new value.

20. The method of claim 19 wherein said set of choices contains only valid choices for the new value.

21. The method of claim 20 wherein said choices include a data type that requires a data format.

22. The method of claim 21 wherein selecting the choice that requires a date format presents a dialog box that displays a set of date formats which may be selected for a new value.

23. The method of claim 22 wherein the said set of date formats contains only valid choices for the new value.

24. The method of claim 18 wherein a restore button is provided in said dialog box, selection of which restores the original value.

25. The method of claim 10 wherein, upon clicking on a selected one of said modification operations, a dialog box drops down that provides a window wherein a new value may be entered from a keyboard.

26. The method of claim 25 wherein said value entered from a keyboard is validated for proper form.

27. The method of claim 26 wherein said value, constituting a name, entered from a keyboard is validated for uniqueness within the context of the enclosing data source structure.

28. The method of claim 25 wherein a restore button is provided in said dialog box, selection of which restores the original value.

29. The method of claim 10 wherein selection of the said modification operation causes the requested change to take place.

30. The method of claim 1 wherein each of said set of values, in a window adjacent to said tree view, is arrayed in a column display with respective names of one value arrayed in a row across said display.

31. The method of claim 30 wherein a value to be modified is selected by clicking on its associated name.

32. The method of claim 31 wherein said set includes a modification operation that comprises changing the identification of the data source character set.

33. The method of claim 31 wherein said set includes a modification operation that comprises changing the base year in a date format.

34. The method of claim 31 wherein said set includes a modification operation that comprises changing the century window for the date formats containing two digit years.

35. The method of claim 31 wherein said set includes a modification operation that comprises changing the name of a schema element to one more meaningful to the user.

36. The method of claim 31 wherein said set includes a modification operation that comprises changing the mapping between a server side data source data item and an OLE DB item type.

37. The method of claim 31 wherein, upon clicking on a selected one of said names, a dialog box drops down to facilitate selection of a new value.

38. The method of claim 37 wherein said dialog box displays a set of choices which may be selected for the new value.

39. The method of claim 38 wherein said set of choices contains only valid choices for the new value.

40. The method of claim 39 wherein said choices include a data type that requires a date format.

41. The method of claim 40 wherein selecting the choice that requires a date format causes presentation of a dialog box that displays a set of date formats which may be selected for a new value.

42. The method of claim 41 wherein the said set of date formats contains only valid choices for the new value.

43. The method of claim 37 wherein a restore button is provided in said dialog box, selection of which restores the original value.

44. The method of claim 31 wherein, upon clicking on a selected one of said names, a dialog box drops down that provides a window wherein a new value may be entered from a keyboard.

45. The method of claim 44 wherein said value entered from a keyboard is validated for proper form.

46. The method of claim 45 wherein said value, constituting a name, entered from a keyboard is validated for uniqueness within the context of the enclosing structure.

47. The method of claim 44 wherein a restore button is provided in said dialog box, selection of which restores the original value.

48. The method of claim 1 wherein said dual Schema File facilitates the step of viewing the original value of a value which has been modified.

49. The method of claim 1 wherein said dual Schema File facilitates the step of restoring the original value of a value which has been modified.

50. The method of claim 1 wherein said step of modifying further includes the step of performing a data entry operation after execution of said point and click operation.

51. Computer executable process steps operative to control a computer and stored on a computer readable medium, said steps being operative to:
- establish a dual Schema File at a client side terminal, said dual Schema File containing an original copy of a data source schema and a modifiable copy of the data source schema;
- display the modifiable copy of the data source schema from the dual Schema File in a split window format including one window which provides a tree view of the schema structure and an adjacent window which displays a set of values related to a selected element of the tree view;
- modify one of said values, at least in part in response to a user executed point and click operation.

52. The process steps of claim 51 wherein said steps are further operative to respond to a data entry operation performed after said point and click operation to modify said one of said values.

53. The process steps of claim 51 wherein said steps are further operative to display organization of the data source in said tree view window.

54. The process steps of claim 53 wherein said steps are operative to include in said tree view a top view root node containing a data source name and a second level listing structures defined for the data source.

55. The process steps of claim 53 wherein said steps are further operative to provide subordination in said tree view at a level three and below which indicates accessible data items collected together and accessible as a group.

56. The process steps of claim 53 wherein said steps are further operative to display number-colon pairs preceding data items appearing in said tree view to indicate a format number of one of a plurality of variable format data types.

57. The process steps of claim 52 wherein said steps are further operative to display numbers surrounded by square brackets following data items appearing in said tree view to indicate a number of repetitions of occurring data items.

58. The process steps of claim 51 wherein said steps are further operative to enable selection of the type of modification to be made to an element of the data source schema in response to right-clicking on said element's name in said tree view.

59. The process steps of claim 51 wherein said process steps are further operative to array each of said set of values, in a window adjacent to said tree view, in a column display with respective names of one value arrayed in a row across said display.

60. The process steps of claim 51 wherein said process steps are further operative to employ said dual Schema File to facilitate the step of viewing the original value of a value which has been modified.

61. The process steps of claim 51 wherein said process steps are operative to employ said dual Schema File to facilitate the step of restoring the original value of a value which has been modified.

62. In a system wherein a set of data source schema data types relating to the organization of data in a server side data source are mapped into a set of OLE DB data types recognized by a client, the client being arranged to access the data source via an OLE DB data provider, the method comprising:
- maintaining a dual Schema File at a client side terminal, said Schema File containing an original copy of the data source schema and a modifiable copy of the data source schema;
- displaying the contents of the modifiable copy in a split window format including one window which provides a tree view of the schema structure and an adjacent window which displays a set of values related to a selected element of the tree view; and
- modifying one of said values, said modifying being achieved at least in part in response to a point and click operation in said adjacent screen.

* * * * *